(12) United States Patent
Kroeger et al.

(10) Patent No.: US 7,724,850 B2
(45) Date of Patent: May 25, 2010

(54) COHERENT TRACK FOR FM IBOC RECEIVER USING A SWITCH DIVERSITY ANTENNA SYSTEM

(75) Inventors: Brian W. Kroeger, Sykesville, MD (US); Paul J. Peyla, Elkridge, MD (US); Jeffrey S. Baird, Columbia, MD (US)

(73) Assignee: iBiquity Digital Corporation, Columbia, MD (US)

( * ) Notice: Subject to any disclaimer, the term of this patent is extended or adjusted under 35 U.S.C. 154(b) by 1696 days.

(21) Appl. No.: 10/874,681

(22) Filed: Jun. 23, 2004

(65) Prior Publication Data

US 2005/0105657 A1    May 19, 2005

Related U.S. Application Data

(63) Continuation-in-part of application No. 10/715,582, filed on Nov. 18, 2003.

(51) Int. Cl.
*H04B 7/10* (2006.01)
(52) U.S. Cl. .................................. 375/347
(58) Field of Classification Search ............... 375/260, 375/347, 261, 325, 349, 350, 341, 326, 285, 375/346; 455/526, 63.3, 703, 142, 205, 216, 455/63.1, 61, 139, 152, 3.02, 206; 370/281, 370/295, 318, 436, 526; 327/310, 42, 60; 381/2–5, 7; 324/336, 618, 102; 360/110, 360/111; 341/157, 158

See application file for complete search history.

(56) References Cited

U.S. PATENT DOCUMENTS

| 4,566,133 A | * | 1/1986 | Rambo | 455/277.2 |
| 5,465,411 A | * | 11/1995 | Koike | 455/275 |
| 5,684,835 A | * | 11/1997 | Kroeger et al. | 375/325 |
| 5,949,796 A | | 9/1999 | Kumar | |
| 6,178,317 B1 | | 1/2001 | Kroeger et al. | |
| 6,317,470 B1 | * | 11/2001 | Kroeger et al. | 375/340 |

(Continued)

FOREIGN PATENT DOCUMENTS

EP    1047236 A1    10/2000

OTHER PUBLICATIONS

R. S. Blum et al., "An Adaptive Spatial Diversity Receiver for Non-Gaussian Interference and Noise," Signal Processing Advances in Wireless Communications, First IEEE Signal Processing Workshop on Signal Processing Advances in Wireless Communications, Paris, France, Apr. 16-18, 1997, pp. 385-388.

*Primary Examiner*—David C Payne
*Assistant Examiner*—Rahel Guarino
(74) *Attorney, Agent, or Firm*—Robert P. Lenart, Esq.; Pietragallo Gordon Alfano Bosick & Raspanti, LLP

(57) ABSTRACT

A method is provided for coherently tracking a radio signal including a plurality of digitally modulated reference subcarriers. The method comprises the steps of receiving symbols transmitted on the reference subcarriers, combining the reference subcarrier symbols with a known reference sequence conjugate to produce a plurality of samples, median filtering the samples to produce filtered samples, and smoothing the samples for each of the reference subcarriers over the plurality of reference subcarriers to produce a coherent reference signal estimate for each of the subcarriers. A receiver for coherently tracking a radio signal including at least one digitally modulated reference carrier is also provided.

15 Claims, 34 Drawing Sheets

U.S. PATENT DOCUMENTS

| | | |
|---|---|---|
| 6,549,544 B1 | 4/2003 | Kroeger et al. |
| 6,590,944 B1 | 7/2003 | Kroeger |
| 6,735,257 B2 | 5/2004 | Kroeger |
| 7,039,370 B2* | 5/2006 | Laroia et al. ............ 455/101 |
| 7,142,579 B2* | 11/2006 | Chou et al. ............ 375/130 |
| 7,457,366 B2* | 11/2008 | Maltsev et al. ............ 375/260 |
| 2001/0055320 A1* | 12/2001 | Pierzga et al. ............ 370/480 |
| 2003/0026360 A1* | 2/2003 | Ramasubramanian et al. ............ 375/343 |
| 2004/0105505 A1 | 6/2004 | Kitamura |

\* cited by examiner

US 7,724,850 B2

COHERENT TRACK FOR FM IBOC RECEIVER USING A SWITCH DIVERSITY ANTENNA SYSTEM

CROSS-REFERENCE TO RELATED APPLICATION

This application is a continuation-in-part of U.S. patent application Ser. No. 10/715,582, filed Nov. 18, 2003, the disclosure of which is hereby incorporated by reference.

FIELD OF THE INVENTION

This invention relates to methods and apparatus for reception of radio signals, and more particularly to such methods and apparatus including a switch diversity antenna system.

BACKGROUND OF THE INVENTION

The iBiquity Digital Corporation HD Radio™ system is designed to permit a smooth evolution from current analog amplitude modulation (AM) and frequency modulation (FM) radio to a fully digital in-band on-channel (IBOC) system. This system delivers digital audio and data services to mobile, portable, and fixed receivers from terrestrial transmitters in the existing medium frequency (MF) and very high frequency (VHF) radio bands. Broadcasters may continue to transmit analog AM and FM simultaneously with the new, higher-quality and more robust digital signals, allowing themselves and their listeners to convert from analog to digital radio while maintaining their current frequency allocations.

Both the hybrid and all-digital formats of the HD Radio™ system utilize a plurality of orthogonal frequency division modulated subcarriers. Reference subcarriers are inserted among the data subcarriers. Coherent demodulation is used in the digital portion of an FM IBOC (In-Band On-Channel) signal for the HD Radio™ system. The multiple roles of the reference subcarriers for acquisition, tracking, estimation of channel state information (CSI) and coherent operation have been described in U.S. Pat. No. 6,549,544. This system was designed for operation in the FM broadcast band (88-108 MHz) with fading bandwidth to accommodate vehicles at highway speeds. The various coherent tracking parameters are estimated using filters with bandwidths that approximate the maximum expected Doppler bandwidth (roughly 13 Hz). With a fixed antenna, the pertinent tracking statistics of the input signal to the tracking algorithms are assumed to vary at a rate no greater than the Doppler bandwidth. However the use of switch diversity antennas in vehicle windows introduces abrupt transients in the coherent tracking which degrade performance of the coherent digital demodulation.

This invention provides improvements to the coherent tracking algorithms which are used autonomously with a blind switch diversity antenna system. These same improvements can also mitigate degradation due to impulsive noise or nongaussian noise such as from an adjacent FM analog interferer. In addition, performance of receivers including fast Automatic Gain Control (AGC) is improved.

SUMMARY OF THE INVENTION

A method is provided for coherently tracking a radio signal including a plurality of digitally modulated reference subcarriers. The method comprises the steps of receiving symbols transmitted on the reference subcarriers, combining the reference subcarrier symbols with a known reference sequence conjugate to produce a plurality of samples, median filtering the samples to produce filtered samples, and smoothing the samples for each of the reference subcarriers over the plurality of reference subcarriers to produce a coherent reference signal estimate for each of the subcarriers.

In another aspect, the invention encompasses a receiver for coherently tracking a radio signal including at least one digitally modulated reference carrier. The receiver comprises an input for receiving the radio signal, and a processor for coherently tracking a radio signal including a plurality of digitally modulated reference subcarriers, by receiving symbols transmitted on the reference subcarriers, combining the reference subcarrier symbols with a known reference sequence conjugate to produce a plurality of samples, median filtering the samples to produce filtered samples, and smoothing the samples for each of the reference subcarriers over the plurality of reference subcarriers to produce a coherent reference signal estimate for each of the subcarriers.

DETAILED DESCRIPTION OF THE INVENTION

Figure 1:
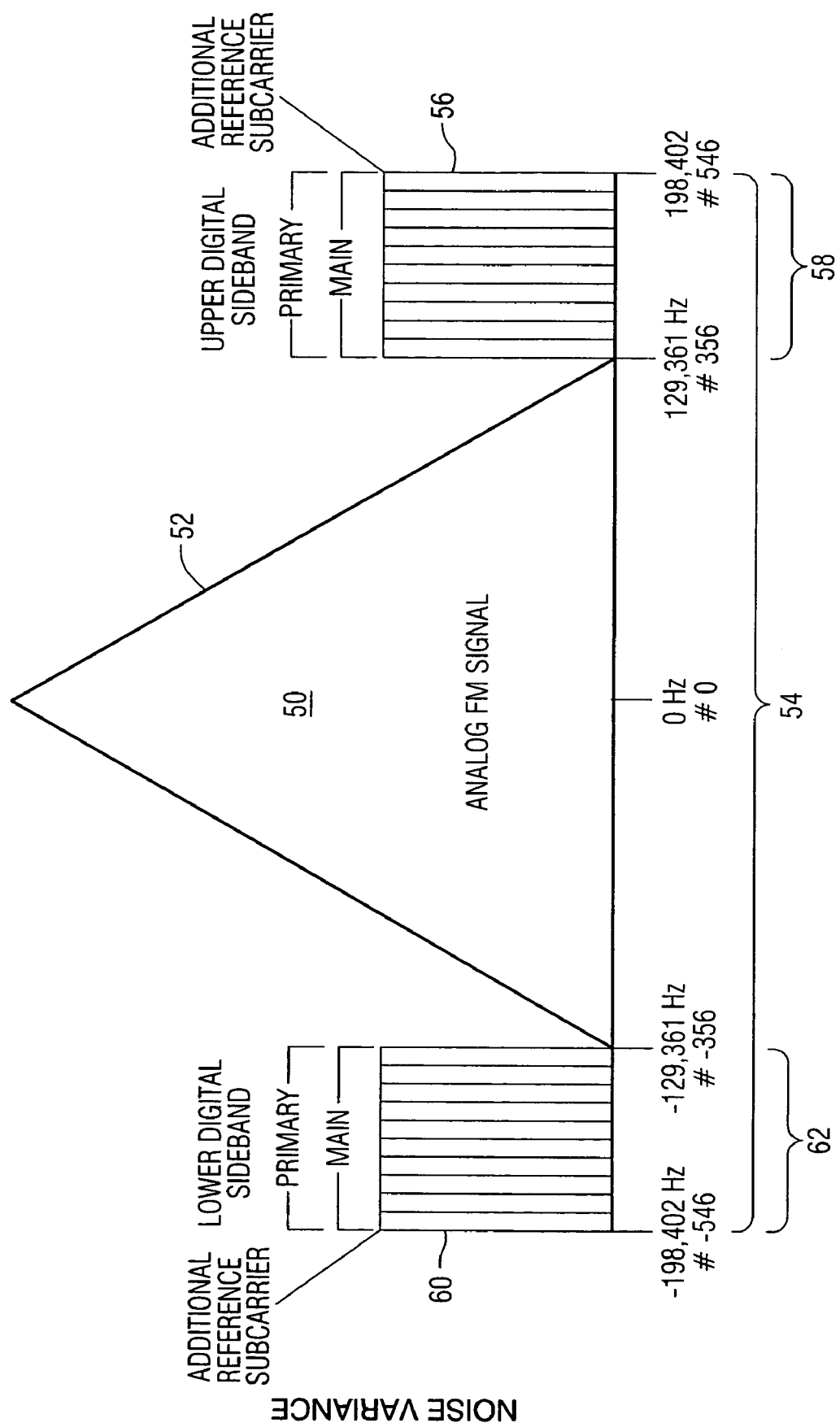
FIG. 1 is a schematic representation of the spectrum of the Hybrid Waveform to which this invention can be applied.

FIG. 1 is a schematic representation of the spectrum of the hybrid FM IBOC waveform 50 to which this invention can be applied. The waveform includes an analog modulated signal 52 located in the center of a broadcast channel 54, a first plurality of evenly spaced orthogonally frequency division multiplexed subcarriers 56 in an upper sideband 58, and a second plurality of evenly spaced orthogonally frequency division multiplexed subcarriers 60 in a lower sideband 62. The digitally modulated subcarriers are broadcast at a lower power level than the analog modulated carrier to comply with required channel signal masks. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated Primary Main subcarriers. The digital signal is transmitted in Primary Main (PM) sidebands on both sides of the analog FM signal in the hybrid waveform. The power level of each sideband is appreciably below the total power in the analog FM signal. The analog signal may be monophonic or stereo, and may include Subsidiary Communications Authorization (SCA) channels.

The subcarriers are located at evenly spaced frequency locations. The subcarrier locations are numbered from −546 to +546. In the waveform of FIG. 1, the subcarriers are at locations +356 to +546 and −356 to −546. This waveform will normally be used during an initial transitional phase preceding conversion to the all-digital waveform.

Each primary main sideband is comprised of ten frequency partitions, which are allocated among subcarriers 356 through 545, or −356 through −545. Subcarriers 546 and −546, also included in the primary main sidebands, are additional reference subcarriers. The amplitude of each subcarrier can be scaled by an amplitude scale factor.

In the hybrid waveform, the digital signal is transmitted in Primary Main (PM) sidebands on either side of the analog FM signal. The power level of each sideband is appreciably below the total power in the analog FM signal. The analog signal may be monophonic or stereo, and may include subsidiary communications authorization (SCA) channels.

Figure 2:
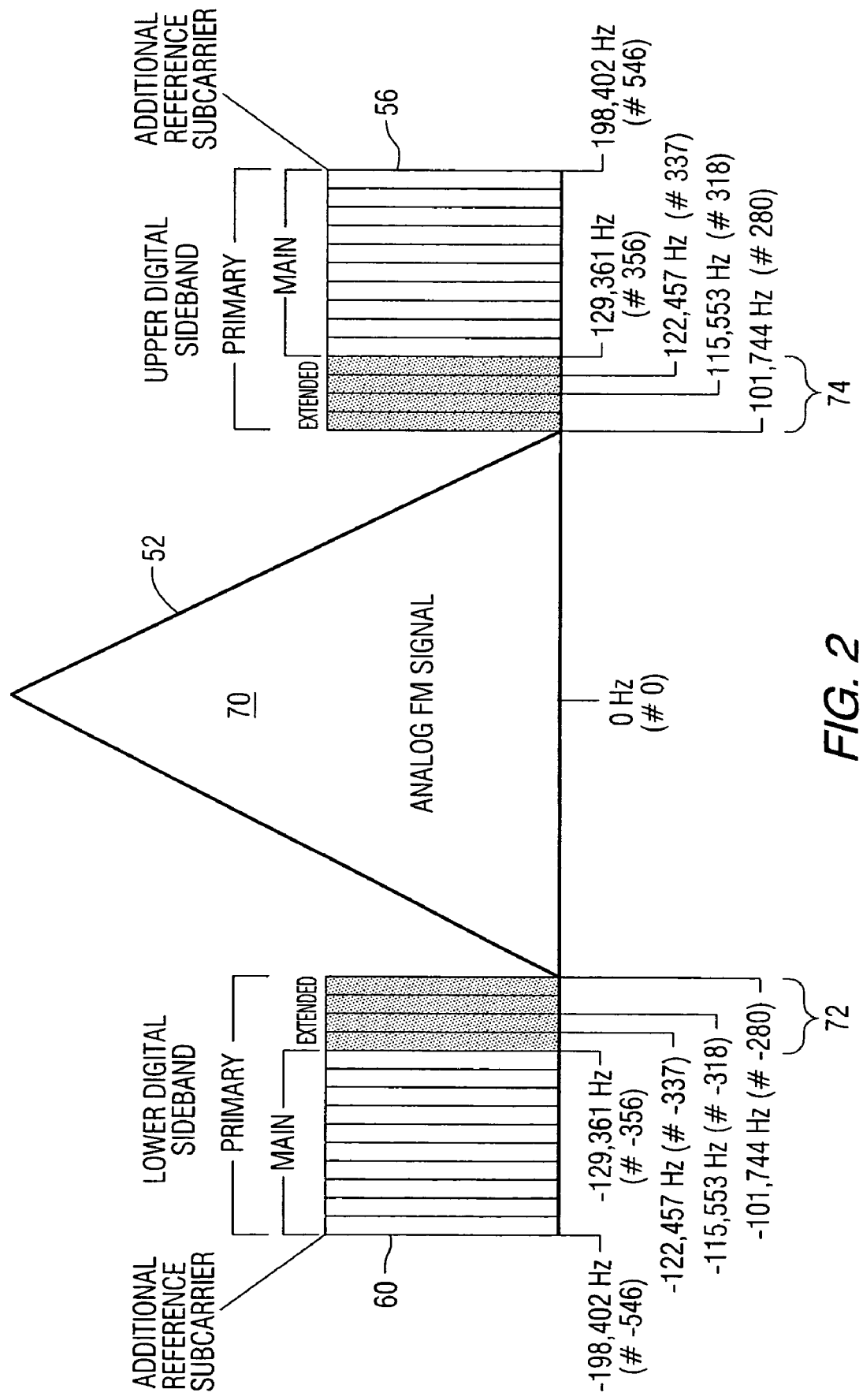
FIG. 2 is a schematic representation of the spectrum of the Extended Hybrid Waveform to which this invention can be applied.

FIG. 2 a schematic representation of the spectrum of the extended hybrid waveform to which this invention can be applied. In the extended hybrid waveform, the bandwidth of the hybrid sidebands can be extended toward the analog FM signal to increase digital capacity. This additional spectrum, allocated to the inner edge of each Primary Main sideband, is termed the Primary Extended (PX) sideband.

The extended hybrid waveform is created by adding Primary Extended sidebands to the Primary Main sidebands present in the hybrid waveform, as shown in FIG. 2. Depending on the service mode, one, two, or four frequency partitions can be added to the inner edge of each Primary Main sideband.

FIG. 2 is a schematic representation of an extended hybrid FM IBOC waveform 70. The extended hybrid waveform is created by adding primary extended sidebands 72, 74 to the primary main sidebands present in the hybrid waveform. Depending on the service mode, one, two, or four frequency partitions can be added to the inner edge of each primary main sideband.

The extended hybrid waveform includes the analog FM signal plus digitally modulated primary main subcarriers (subcarriers +356 to +546 and −356 to −546) and some or all primary extended subcarriers (subcarriers +280 to +355 and −280 to −355). This waveform will normally be used during an initial transitional phase preceding conversion to the all-digital waveform.

Each primary main sideband includes ten frequency partitions and an additional reference subcarrier spanning subcarriers 356 through 546, or −356 through −546. The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 3:
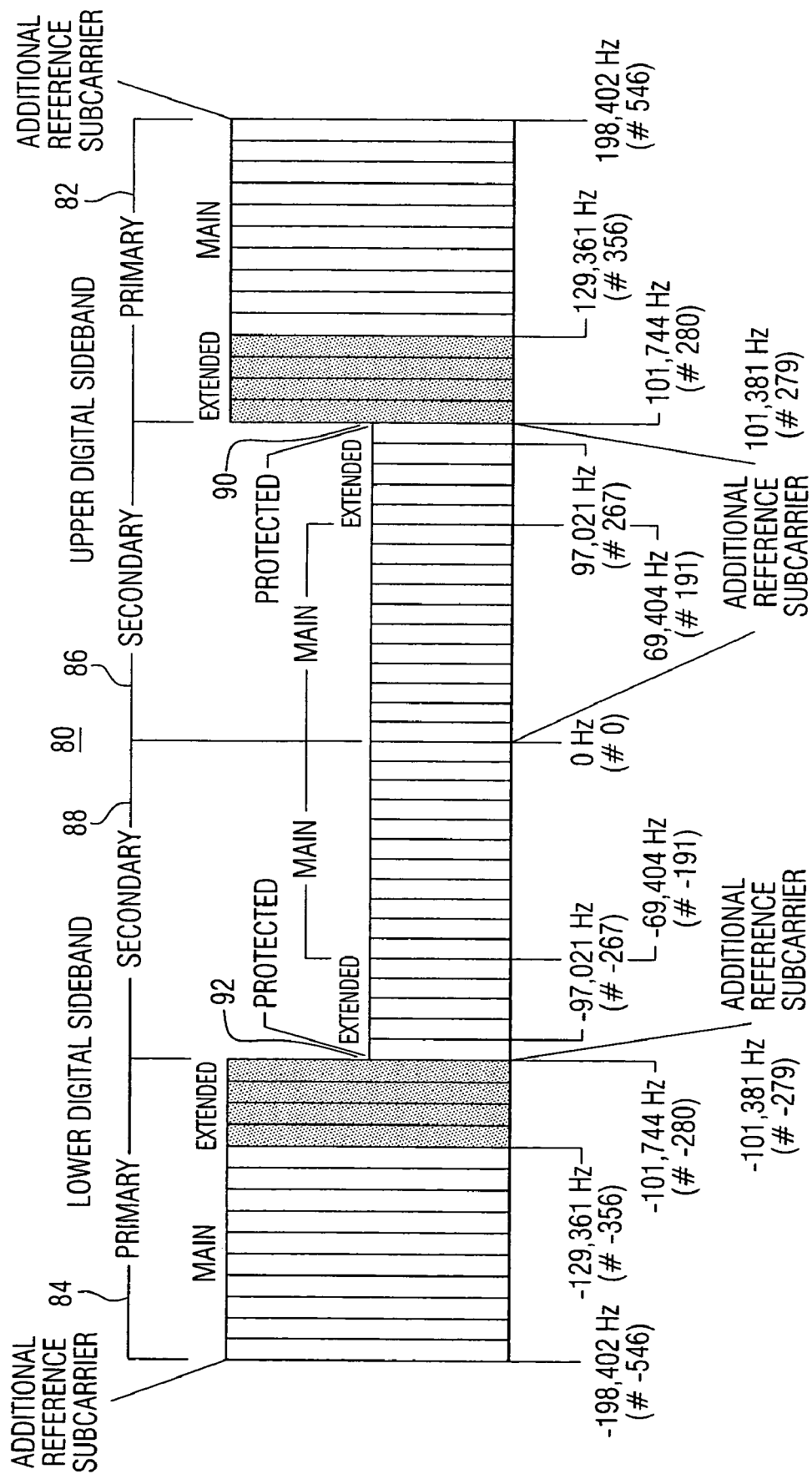
FIG. 3 is a schematic representation of the spectrum of the All-Digital Waveform to which this invention can be applied.

FIG. 3 is a schematic representation of the spectrum of the all-digital waveform to which this invention can be applied. FIG. 3 is a schematic representation of an all-digital FM IBOC waveform 80. The all-digital waveform is constructed by disabling the analog signal, fully expanding the bandwidth of the primary digital sidebands 82, 84, and adding lower-power secondary sidebands 86, 88 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten Secondary Main (SM) and four Secondary Extended (SX) frequency partitions. Unlike the primary sidebands, however, the Secondary Main frequency partitions are mapped nearer to channel center with the extended frequency partitions further from the center.

Each secondary sideband also supports a small Secondary Protected (SP) region 90, 92 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each Secondary Main sideband spans subcarriers 1 through 190 or −1 through −190. The upper Secondary Extended sideband includes subcarriers 191 through 266, and the upper Secondary Protected sideband includes subcarriers 267 through 278, plus additional reference subcarrier 279. The lower Secondary Extended sideband includes subcarriers −191 through −266, and the lower Secondary Protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

All three waveform types conform to the currently allocated spectral emissions mask. The digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

Figure 4:
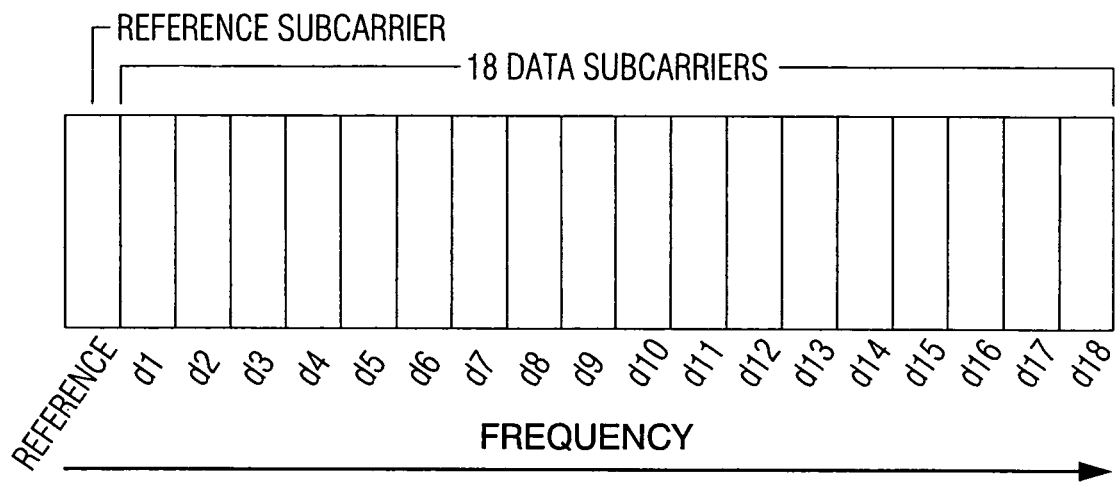
FIG. 4 is a schematic representation of a first type of Frequency Partition-Ordering.
Figure 5:
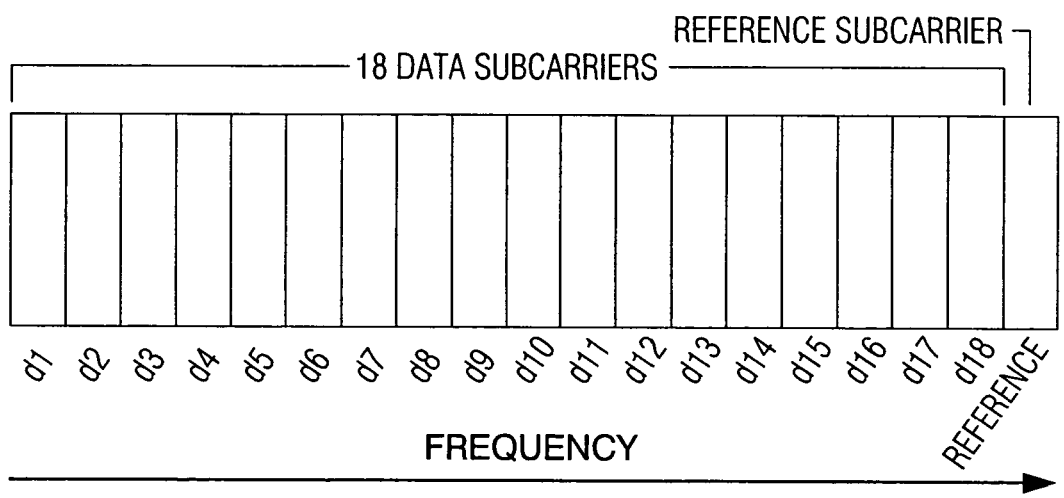
FIG. 5 is a schematic representation of a second type of Frequency Partition-Ordering.

The OFDM subcarriers are assembled into frequency partitions. FIG. 4 a schematic representation of a first type of Frequency Partition-Ordering. FIG. 5 a schematic representation of a second type of Frequency Partition-Ordering. Each frequency partition consists of eighteen data subcarriers and one reference subcarrier, as shown in FIG. 4 (ordering A) and FIG. 5 (ordering B). The position of the reference subcarrier (ordering A or B) varies with the location of the frequency partition within the spectrum.

Signal processing is performed in protocol layers in the transmitter of a digital audio broadcasting system. Control and information signals are passed through the various layers of the protocol stack to generate an IBOC signal on the broadcast side. Receivers process the signal in corresponding protocol layers.

The Main Program Service preserves the existing analog radio-programming formats in both the analog and digital transmissions. In addition, the Main Program Service can include digital data that directly correlates with the audio programming.

A Protocol Data Unit (PDU) is exchanged between peer layers (e.g., from layer n of the transmit side to layer n of the receive side). A fundamental purpose of any layer n of the protocol stack is to deliver PDUs provided by layer n+1 of the transmitter to a peer layer n+1 on the receiver system. The layer n+1 PDU payload consists of layer n+1 protocol control information (PCI) and the upper layer (layer n+2) PDU.

To further understand this concept, consider the flow of information from a layer n+1 to a layer n on the transmit side. Layer n+1 PDUs must be packaged as specified by the layer n service. That package is called a service data unit, or SDU. A layer n SDU includes the layer n+1 PDU plus the layer n SDU control information (SCI). Layer n+1 creates the layer n SDU and sends it to layer n via the layer n service access point.

When layer n receives the SDU, it takes the layer n+1 PDU and its own protocol control information (PCI), which may include information received in the SCI, and creates a layer n PDU. The layer n PDU is then sent to the peer layer on the receiving system, where the process is essentially reversed as information goes up the protocol layers. Hence, each layer extracts the peer PDU and forwards the remaining information to the next layer in the form of an SDU.

Layer L1 represents the physical layer wherein signals are prepared for transmission through an antenna. Layer L2 is coupled to layer L1. For each frequency partition, data subcarriers d1 through d18 convey the L2 PDUs, while the reference subcarriers convey L1 system control. Subcarriers are numbered from 0 at the center frequency to ±546 at either end of the channel frequency allocation.

Figure 6:
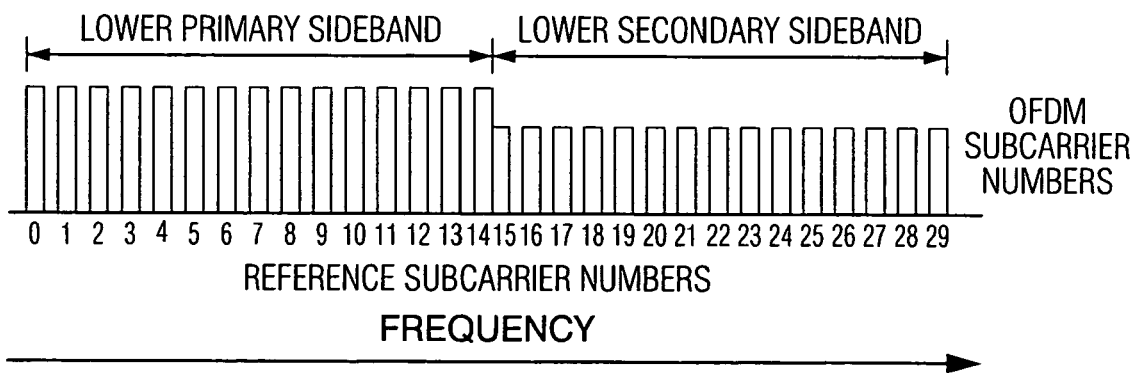
FIG. 6 is a schematic representation of Lower Sideband Reference Subcarrier Spectral Mapping.
Figure 7:
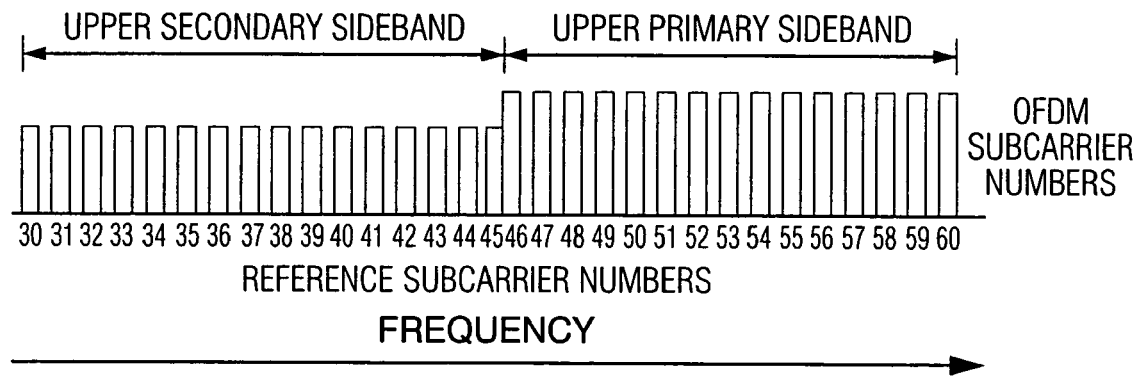
FIG. 7 is a schematic representation of Upper Sideband Reference Subcarrier Spectral Mapping.

Besides the reference subcarriers resident within each frequency partition, depending on the service mode, up to five additional reference subcarriers are inserted into the spectrum at subcarrier numbers −546, −279, 0, 279, and 546. The overall effect is a regular distribution of reference subcarriers throughout the spectrum. For notational convenience, each reference subcarrier is assigned a unique identification number between 0 and 60. All lower sideband reference subcarriers are shown in FIG. 6. All upper sideband reference subcarriers are shown in FIG. 7. The figures indicate the relationship between reference subcarrier numbers and OFDM subcarrier numbers.

FIGS. 1-3 show the subcarrier number and center frequency of certain key OFDM subcarriers. The center frequency of a subcarrier is calculated by multiplying the subcarrier number by the OFDM subcarrier spacing $\Delta f$. The center of subcarrier 0 is located at 0 Hz. In this context, center frequency is relative to the Radio Frequency (RF) allocated channel. For example, the upper Primary Main sideband is bounded by subcarriers 356 and 546, whose center frequencies are located at 129,361 Hz and 198,402 Hz, respectively. The frequency span of the Primary Main sideband is 69,041 Hz (198,402-129,361).

Figure 8:
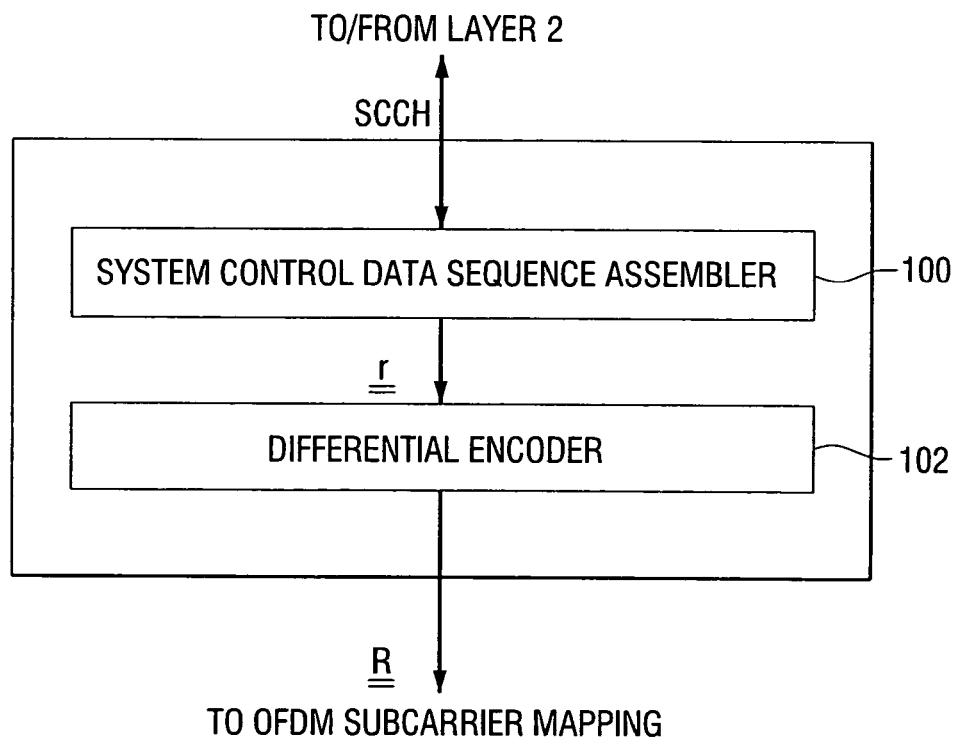
FIG. 8 is a block diagram of System Control Processing.

FIG. 8 is a block diagram of System Control Processing. The System Control Channel (SCCH) transports control and status information using fields in the Reference Subcarriers. In addition, several bits of the system control data sequence designated "reserved" are controlled from layers above L1 via the primary reserved control data interface and the secondary reserved control data interface. The service modes dictate all permissible configurations of the logical channels.

Under the direction of the upper layers, System Control Processing assembles and differentially encodes a sequence of bits (system control data sequence) destined for each reference subcarrier, as shown in FIG. 8. There are up to 61 reference subcarriers, numbered 0 . . . 60, distributed throughout the OFDM spectrum.

As shown in FIG. 8, System Control Processing receives inputs from Layer 2 via the SCCH. Using the system control inputs, the System Control Data Sequence Assembler 100 creates the system control bit sequence over $T_b$ for each of the 61 reference subcarriers. The Differential Encoder 102 then differentially encodes each bit sequence in time. The resulting output is a matrix R, of fixed dimension 32×61. The row dimension of R corresponds to the number of OFDM symbols per $T_b$, and the column dimension corresponds to the maximum number of active reference subcarriers per OFDM symbol. The matrix R is available to OFDM Subcarrier Mapping at the rate $R_b$. In addition, System Control Processing provides the L1 block count to Layer 2 at the rate $R_b$ via the SCCH.

The System Control Data Sequence Assembler collects all system control information from Layer 2 and, together with some layer control information, develops a matrix r of 61 32-bit system control data sequences. The rows of r are numbered 0 ... 31, and the columns are numbered 0 ... 60. Each row of r contains one bit of the system control data sequence for each reference subcarrier (before differential encoding), and is transmitted in the same OFDM symbol. Row 0 is populated first. Any given column of r contains the system control data sequence for a single reference subcarrier over 32 OFDM symbols.

Figure 9:
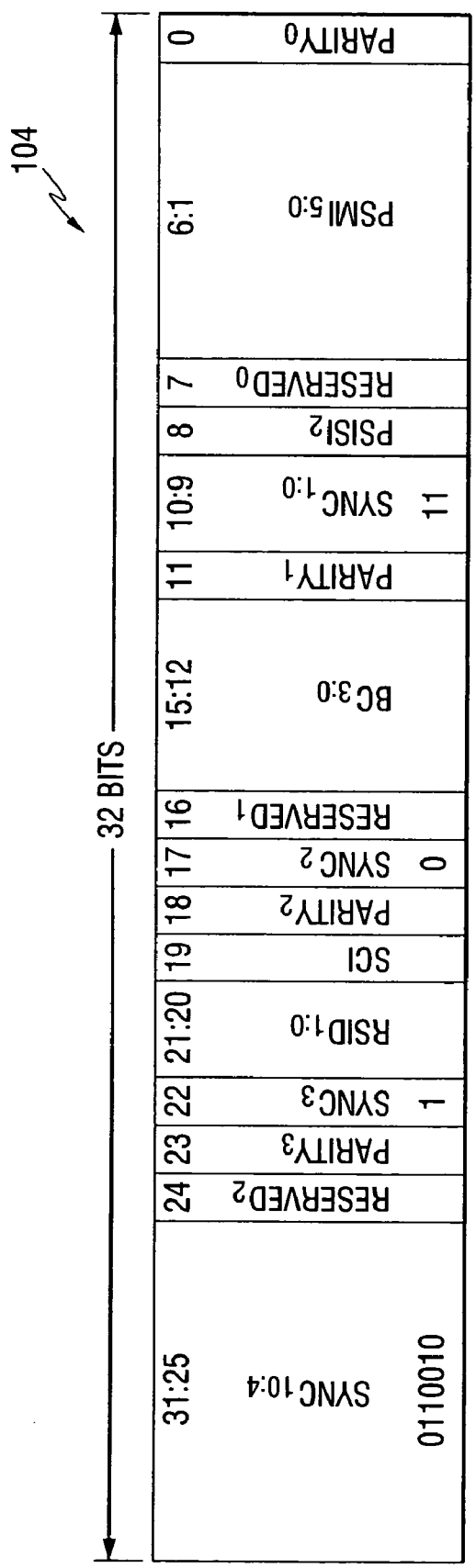
FIG. 9 is a schematic representation of a Primary Reference Subcarrier System Control Data Sequence.

FIG. 9 a schematic representation of a Primary Reference Subcarrier System Control Data Sequence 104. The system control data sequence consists of bit fields that represent the various system control components. Reference subcarriers located in primary sidebands have different fields than reference subcarriers located in secondary sidebands. Information in the primary reference subcarriers applies only to primary services, and information in the secondary reference subcarriers applies only to secondary services. The primary reference subcarrier system control data sequence is depicted in FIG. 9 and defined in Table 1. Bits 31 through 0 map to rows 0 through 31 of r, respectively. The Secondary reference subcarriers are defined in a similar manner.

time. This input bit is modulo-2 added with the previously stored output bit R[i−1][j] to form the latest output bit, R[i][j]. The resulting output bit stream will reverse polarity each time the input bit is a 1. The initial state of each differential encoder is 0.

The Reference Subcarriers are modulated with a repeating 32-bit BPSK Timing Sequence, which is differentially encoded prior to transmission. The Reference Subcarriers serve multiple purposes: 1) resolution of subcarrier ambiguity on acquisition, 2) local phase reference for subsequent coherent detection, 3) local noise and/or interference samples for estimation of Channel State Information (CSI), and 4) phase error information for frequency and symbol tracking. Differential coding of the BPSK Timing Sequence permits detection of the BPSK Timing Sequence prior to establishment of the coherent reference needed for the remaining subcarriers. The differentially detected pattern is then used to remove the data modulation from the Reference Subcarriers, leaving information about the local phase of the reference as well as noise or interference samples. This is used to estimate the CSI needed for subsequent soft-decision decoding.

Figure 11:
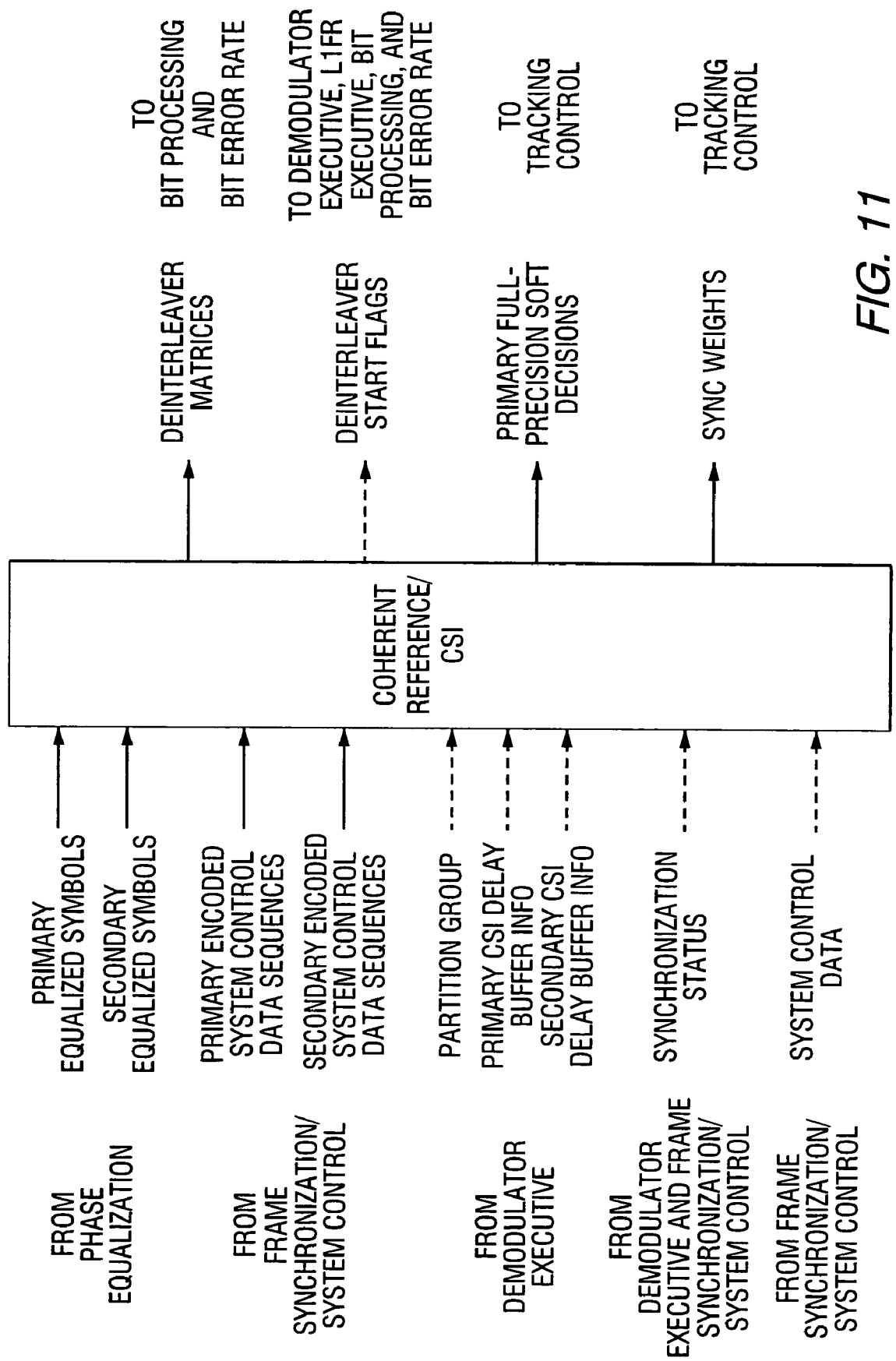
FIG. 11 is a high-level block diagram of a Coherent Reference/CSI function.

FIG. 11 is a high level block diagram of a Coherent Reference/CSI function. The 11 sync bits of the Block Sync pattern are sufficient for uniquely defining the boundaries of each block, regardless of the values of the remaining 21 bits. BPSK is chosen for the Reference Subcarrier since it is more tolerant of noise and channel impairments than differentially

TABLE 1

Primary System Control Data Sequence Bit Map

| Field | Bit Index | Bit Length | Description |
|---|---|---|---|
| $Sync_{10:4}$ | 31:25 | 7 | $Sync_{10:4} = 0110010$ |
| $Reserved_2$ | 24 | 1 | Controlled by upper layers of the protocol stack |
| $Parity_3$ | 23 | 1 | Even parity for $Reserved_2$ |
| $Sync_3$ | 22 | 1 | $Sync_3 = 1$ |
| Reference Subcarrier Identification ($RSID_{1:0}$) | 21:20 | 2 | Fixed two-bit identifier per reference subcarrier |
| Secondary Channel Indicator (SCI) | 19 | 1 | 0 = primary only (Hybrid or Extended Hybrid) |
| | | | 1 = primary and secondary (All-Digital) |
| $Parity_2$ | 18 | 1 | Even parity for SCI and $RSID_{1:0}$ |
| $Sync_2$ | 17 | 1 | $Sync_2 = 0$ |
| $Reserved_1$ | 16 | 1 | Controlled by upper layers of the protocol stack |
| L1 Block Count ($BC_{3:0}$) | 15:12 | 4 | Modulo-16 count which increments every 32 OFDM symbols. |
| $Parity_1$ | 11 | 1 | Even parity for $BC_{3:0}$ and $Reserved_1$ |
| $Sync_{1:0}$ | 10:9 | 2 | $Sync_{1:0} = 11$ |
| P3 Interleaver Select Indicator (P3ISI) | 8 | 1 | 0 = short P3 interleaver depth in use |
| | | | 1 = long P3 interleaver depth in use |
| $Reserved_0$ | 7 | 1 | Controlled by upper layers of the protocol stack |
| Primary Service Mode Indicator ($PSMI_{5:0}$) | 6:1 | 6 | Primary service mode value |
| $Parity_0$ | 0 | 1 | Even parity for $PSMI_{5:0}$, $Reserved_0$, and P3ISI |

Figure 10:
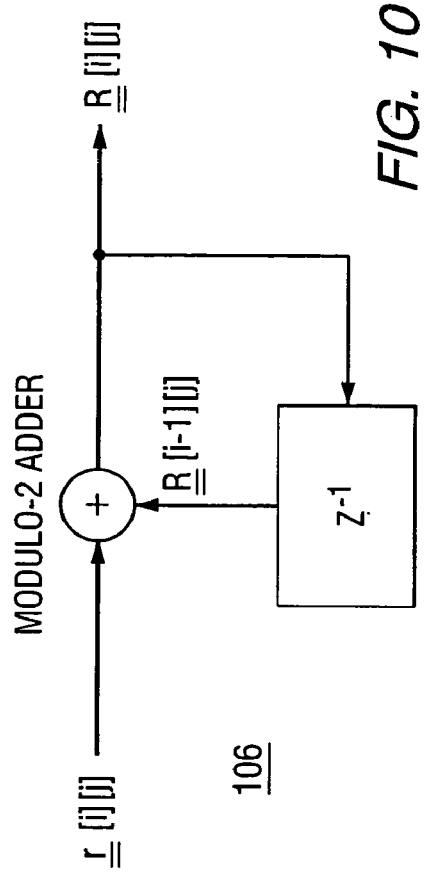
FIG. 10 is a block diagram of a Differential Encoder.

FIG. 10 is a block diagram of a Differential Encoder 106. The bits in each column of the 32×61 matrix r, assembled by the System Control Data Sequence Assembler, are differentially encoded in accordance with FIG. 10, and are output to the matrix R in the same order. Conceptually, this process can be viewed as 61 parallel differential encoders. For an individual differential encoder, the bits of a single column j of r are processed sequentially, from i=0 ... 31. One system control data sequence bit is input to a differential encoder at a detected QPSK. Furthermore, the redundancy of the BPSK Timing Sequence over all Reference Subcarriers yields a robust reference even under the most severe interference and channel conditions. The variable fields in the BPSK Timing Sequence (Hybrid/Digital, Spare, Block Count, and Mode) are parity checked for both error protection and to eliminate phase reference changes at the end of each variable field due to differential encoding. The same BPSK Timing Sequence (with the exception of the 2-bit reference subcarrier ID field)

is redundantly transmitted at all Reference Subcarrier locations and is coincident with the Block of the Interleaver defined in the Block Count field.

The coherent reference/CSI module generates a phase reference for coherently detecting data subcarriers, and appropriately weights the resulting soft decisions based on the current channel state. The complex weighted soft decisions are then scaled, limited, and stored in the appropriate deinterleaver matrices for output to the bit processing module.

The magnitude of the weighted soft decisions is smoothed over time to form a set of synchronization weights for the tracking control module. In addition, the full-precision floating-point soft decisions are also passed to the tracking control module to detect erroneous symbol tracking conditions.

Figure 12:
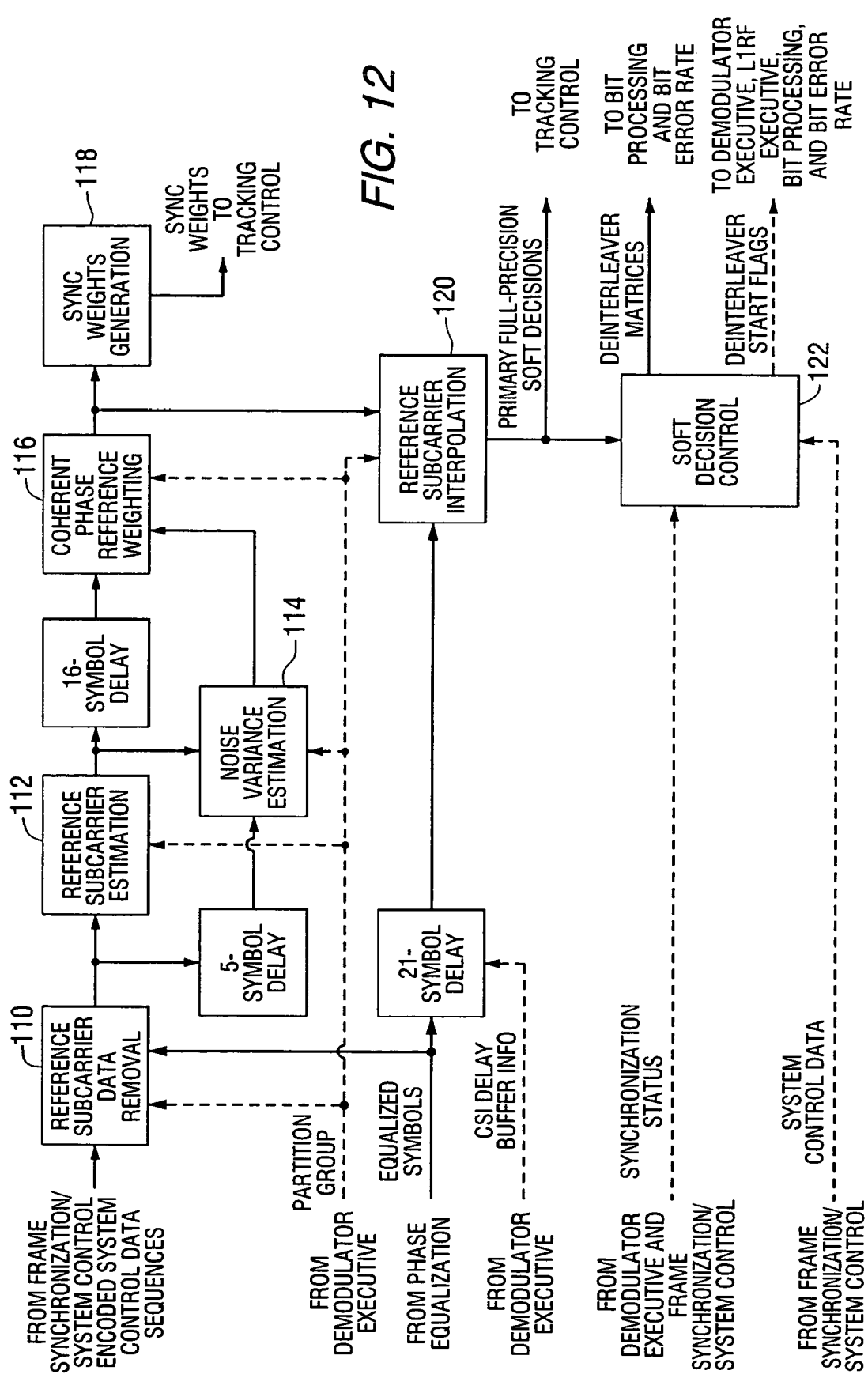
FIG. 12 is a detailed block diagram of the Coherent Reference/CSI function.

FIG. 12 is a detailed block diagram of the Coherent Reference/CSI function. Every OFDM symbol time, upper primary, lower primary, and secondary phase-equalized, frequency-domain symbols are received from the phase equalization module. Each symbol is comprised of a number of reference and data subcarriers. The reference subcarriers are used to generate a coherent phase reference and CSI weights, which are then applied to the data subcarriers to create soft decisions destined for bit processing and tracking control. In addition, the CSI weights are used to produce synchronization weights for the tracking control module. The coherent reference/CSI module is not executed until the frame synchronization/system control module detects the location of a subframe (L1 block) boundary.

The detailed block diagram in FIG. 12 shows that the coherent reference/CSI module is comprised of seven main functional components:

Reference subcarrier data removal 110
Reference subcarrier estimation 112
Noise variance estimation 114
Coherent phase reference weighting 116
Sync weights generation 118
Reference subcarrier interpolation 120
Soft decision control 122

The operation and interaction of these functional components is briefly summarized below. Using encoded system control data sequences from the frame synchronization/system control module, the reference subcarrier data removal component strips the data from each phase-equalized reference subcarrier in the received OFDM symbol. Removal of the modulation from the reference subcarriers allows accurate estimation of the phase of the received signal for coherent detection.

The data-stripped reference subcarriers are then filtered—in time and frequency—by the reference subcarrier estimation component. The magnitude of each filtered reference subcarrier estimates its average signal power, while the angle provides the coherent phase reference required for coherent detection of the demodulated OFDM data subcarriers.

In order to optimize performance of the Viterbi decoder, the magnitude of each demodulated OFDM subcarrier must be weighted by an estimate of its signal-to-noise ratio. This "CSI estimate" is calculated and applied by the coherent phase reference weighting component. The signal power estimate is simply the magnitude of each filtered reference subcarrier, while the noise power estimate of each reference subcarrier is provided by the noise variance estimation component. The coherent phase reference weighting component divides the filtered reference subcarriers by their corresponding noise variance estimates, forming CSI-weighted coherent phase references for each reference subcarrier.

Application of the CSI-weighted coherent phase references to the data subcarriers is then performed by the reference subcarrier interpolation component. This component interpolates between the reference subcarrier coherent phase references, and applies the interpolated references to the corresponding data subcarriers. The resulting floating-point soft decisions are passed to the tracking control module for detection of erroneous symbol tracking conditions. In addition, the soft decision control component scales and quantizes the floating-point soft decisions, and places them in the appropriate deinterleaver matrices for output to the bit processing and BER modules.

The sync weights generation component calculates the magnitude of the CSI-weighted coherent phase references, smooths them over time, and passes them to tracking control for use as synchronization weights.

Both primary and secondary sidebands are processed by the main functional components. The inputs to the coherent reference/CSI module are equalized symbols, encoded system control data sequences, partition group, CSI delay buffer info, synchronization status, and system control data.

Equalized symbols are used to generate a coherent phase reference and CSI weights, which are applied to data subcarriers to create output soft decisions. Every OFDM symbol time, an upper primary equalized symbol and a lower primary equalized symbol are delivered from the phase equalization module. In addition, the phase equalization module also delivers a secondary equalized symbol at the OFDM symbol rate $R_s$ (344.53125 Hz). Each upper or lower primary symbol is comprised of 267 complex samples. Each secondary symbol is comprised of 559 complex samples.

The encoded system control data sequences are used to strip the data from the reference subcarriers in the equalized symbols. The frame synchronization/system control module delivers primary and secondary encoded system control data sequences to the coherent reference/CSI module. Four primary and four secondary sequences are delivered: one for each reference subcarrier identification (RSID) value. Each sequence provides a single value at the symbol rate.

Although all sidebands are processed similarly by the functional components in the coherent reference/CSI module, the subcarriers on which they operate can vary with the service mode. The partition group identifies the frequency partitions that are populated within a given symbol. It indicates which primary extended partitions and secondary sidebands are available for processing. A single partition group value is delivered from the demodulator executive every symbol time.

The CSI delay buffer info is simply the address of the last element of the 22-symbol CSI delay circular buffer. This buffer aligns the input equalized symbols with their corresponding CSI-weighted coherent phase references. The CSI delay buffer info is used to wrap the circular buffer pointers. There are two CSI delay buffer info inputs: one for primary sidebands, and one for secondary sidebands. Each input provides a single value at the symbol rate.

The synchronization status consists of two flags: one from the frame sync/system control module indicating a valid block count, and the other from the demodulator executive indicating that the input equalized symbols have been sufficiently delayed to allow proper alignment with their CSI-weighted coherent phase references. The two synchronization status values are delivered every symbol time.

The system control data, delivered by the frame synchronization/system control module, includes a primary service mode, secondary service mode, and block count. The service modes are used by the soft decision control component to determine the location and number of output soft decisions. The block count indicates the index of the current L1 block, and is used by the soft decision control component to determine when soft decisions can be directed to the appropriate deinterleaver matrices. The three system control data values are delivered every symbol time.

The outputs of the coherent reference/CSI module are deinterleaver matrices, deinterleaver start flags, primary full-precision soft decisions, and sync weights. Every symbol time, the coherent reference/CSI module directs quantized soft decisions into primary and secondary deinterleaver matrices. The number of soft decisions and their destination deinterleaver matrices are determined by the service mode. Every L1 block, all soft decisions within the deinterleaver matrices are passed to the bit processing and BER modules by the demodulator executive.

The reference subcarrier data removal component strips the modulation from the input phase-equalized reference subcarriers using the encoded system control data sequences from the frame synchronization/system control module. This allows accurate phase estimation of the received signal for coherent detection.

The reference subcarriers are first extracted from the input phase equalized subcarriers. The lower primary sideband contains reference subcarriers 0 to 14, the secondary sidebands contain reference subcarriers 15 through 45, and the upper primary sideband contains reference subcarriers 46 through 60.

The modulation is removed from the reference subcarriers by multiplying the complex conjugate of the reference subcarrier data by a complex data value from one of four encoded system control data sequences. The following equation illustrates the operation for each reference subcarrier within each OFDM symbol:

$$y = x^* \cdot (1+j) \cdot p_n$$

where y is the complex stripped reference subcarrier data value, x is the complex input reference subcarrier data value, n is the encoded system control data sequence number (0, 1, 2, or 3), and $p_n$ is the appropriate system control data value:

$$p_n = \pm \frac{1}{\sqrt{2}}$$

The quantity $(1+j) \cdot p_n$ represents the two BPSK constellation points, unperturbed by noise.

A single value from each system control data sequence is received each OFDM symbol time. The four encoded system control data sequences received from the frame synchronization/system control module are modulated with the four possible reference subcarrier ID (RSID) numbers. Reference subcarriers data values are multiplied by the system control data values that share the same RSID.

Figure 13:
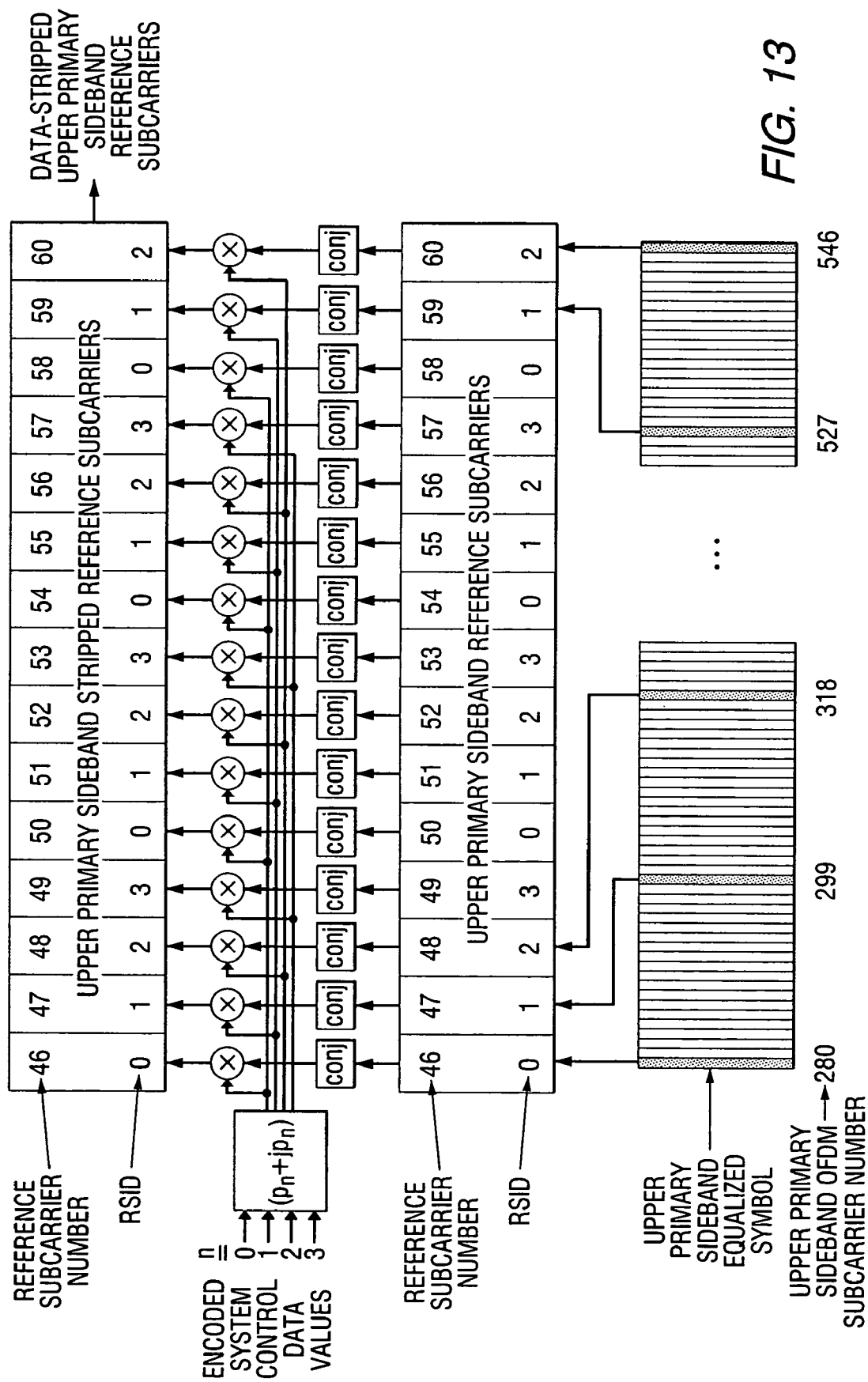
FIG. 13 is a schematic representation of the Upper Primary Sideband Reference Subcarrier Data Removal.

The reference subcarrier data removal operation is illustrated for the upper primary in FIG. 13. The reference subcarrier data removal operations for the other sidebands are performed in a similar manner.

The reference subcarrier estimation component filters the data-stripped reference subcarriers in both time and frequency. The magnitude of each filtered reference subcarrier estimates its average signal power, while the angle estimates its coherent phase reference.

The data-stripped reference subcarriers are first passed through an 11-tap time-domain FIR filter. Since each reference subcarrier is individually filtered, there are effectively 15 filters in parallel for both the upper and lower primary sidebands, and 31 parallel filters for the secondary sidebands.

The resulting time-filtered reference subcarriers are then filtered across frequency using a cascade of four 3-tap FIR filters. Each stage is executed for all reference subcarriers within a single OFDM symbol before proceeding to the next stage. In order to fill the filter memory for the outer reference subcarriers, the end points (as determined by partition group) must be duplicated. Detailed block diagrams of the reference subcarrier estimation process for the primary and secondary sidebands are shown in FIGS. 14 and 15, respectively.

Figure 14:
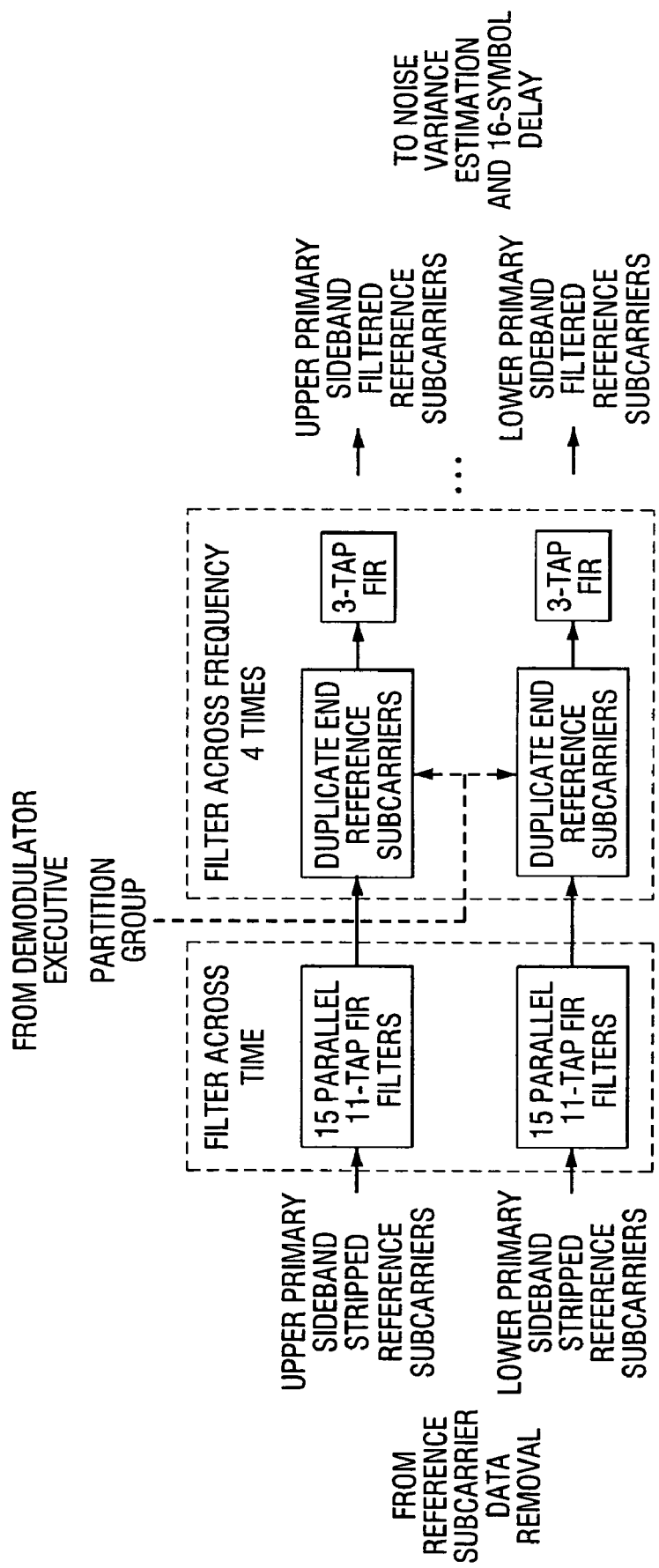
FIG. 14 is a block diagram of the Primary Sideband Reference Subcarrier Estimation.
Figure 15:
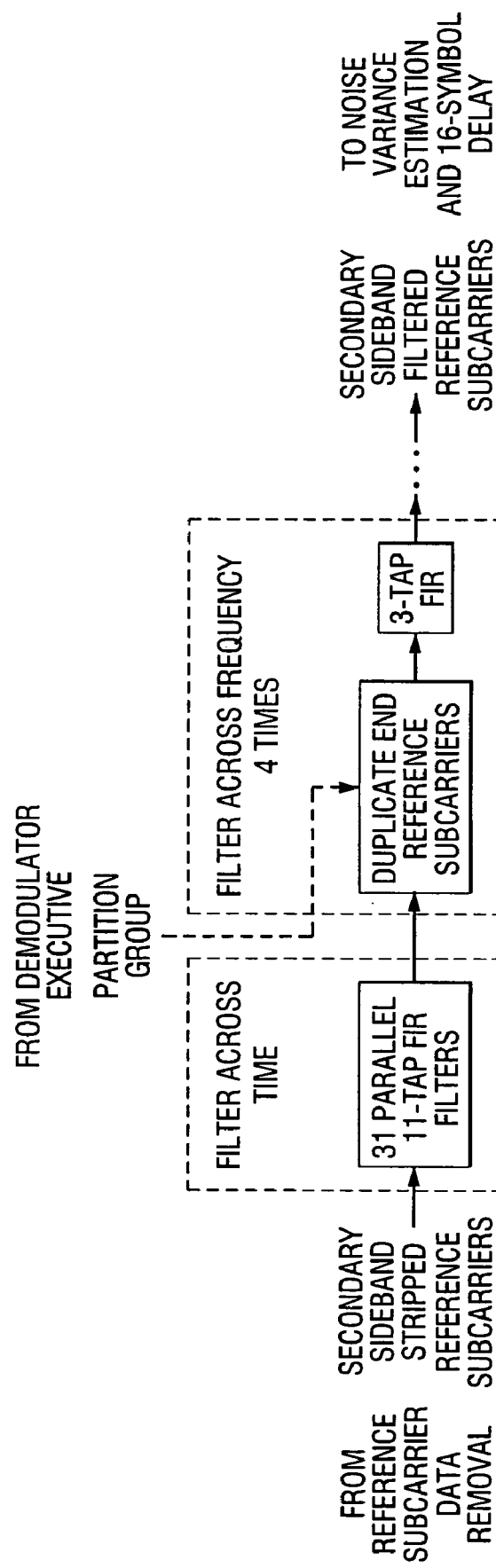
FIG. 15 is a block diagram of the Secondary Sideband Reference Subcarrier Estimation.

FIG. 14 is a block diagram of the Primary Sideband Reference Subcarrier Estimation. FIG. 15 is a block diagram of the Secondary Sideband Reference Subcarrier Estimation. The time-domain filtering operation is as follows for each reference subcarrier in OFDM symbol n:

$$y[n] = \sum_{k=0}^{10} x[n-k] \cdot h[k]$$

where y[n] is the output time-filtered reference subcarrier for OFDM symbol n, x[n] is the input stripped reference subcarrier for OFDM symbol n, h[k] is the FIR filter coefficient array, and k is the filter summation index. For each OFDM symbol, all reference subcarriers are filtered across frequency by executing the following four equations in succession:

$$a[m] = \sum_{k=0}^{2} y[m+k-1] \cdot h[k]$$

$$b[m] = \sum_{k=0}^{2} a[m+k-1] \cdot h[k]$$

$$c[m] = \sum_{k=0}^{2} b[m+k-1] \cdot h[k]$$

$$d[m] = \sum_{k=0}^{2} c[m+k-1] \cdot h[k]$$

where y[m] is the input time-filtered reference subcarrier, h[k] is the FIR filter coefficient array, and k is the filter summation index. In the above equations, m represents the reference subcarrier index, whose range for a particular sideband is a function of partition group. In addition, a[m], b[m], c[m], and d[m] are the outputs of the first, second, third, and final stages of the FIR filter, respectively.

In the filtering across frequency operation, the first and last reference subcarriers in a sideband are repeated at the start and end of each filter stage, respectively, in order to fill the filter memory for filtering of the first and last subcarriers. For the upper primary sideband, the following reference subcarriers are duplicated as a function of the partition group:

reference subcarrier 60 is duplicated and placed in an extra memory location for all partition groups;

reference subcarrier 50 is duplicated and placed in the position of reference subcarrier 49 for partition group "Extend0" (service mode MP1);

reference subcarrier 49 is duplicated and placed in the position of reference subcarrier 48 for partition group "Extend1" (service mode MP2);

reference subcarrier 48 is duplicated and placed in the position of reference subcarrier 47 for partition group "Extend2" (service mode MP3);

reference subcarrier 46 is duplicated and placed in an extra memory location for partition group "Extend4" (service modes MP4, MP5, MP6, and MP7).

The filtering for the other sidebands are done in a similar manner.

The noise variance estimation component calculates a noise power estimate for each reference subcarrier. This noise power estimate is used by the coherent phase reference weighting component to weight the stripped, filtered reference subcarriers with CSI estimates.

The filtered reference subcarriers from the reference subcarrier estimation component (signal) are subtracted from their corresponding delayed, stripped reference subcarriers (signal plus noise) to form complex noise estimates (signal plus noise−signal=noise) for each reference subcarrier in the primary and secondary sidebands. The magnitude squared of the complex noise estimates are then filtered in frequency and time, producing average noise variance estimates for each reference subcarrier.

The magnitude squared operation is performed on all reference subcarrier noise values, producing noise variance samples. The noise variance samples are then filtered across frequency, for reference subcarrier estimation. The frequency-filtered noise variance estimates are then passed to IIR noise estimation filters. There are a total of 15 separate IIR filters for both the upper and lower primary sidebands, and 31 separate IIR filters for the secondary sidebands (one filter for each reference subcarrier noise variance sample). The IIR filters are unity-gain, two-pole lossy integrators that average the input noise variance samples. They are executed only once per OFDM symbol time. The estimated average noise variance for each reference subcarrier is output from the filters.

Figure 16:
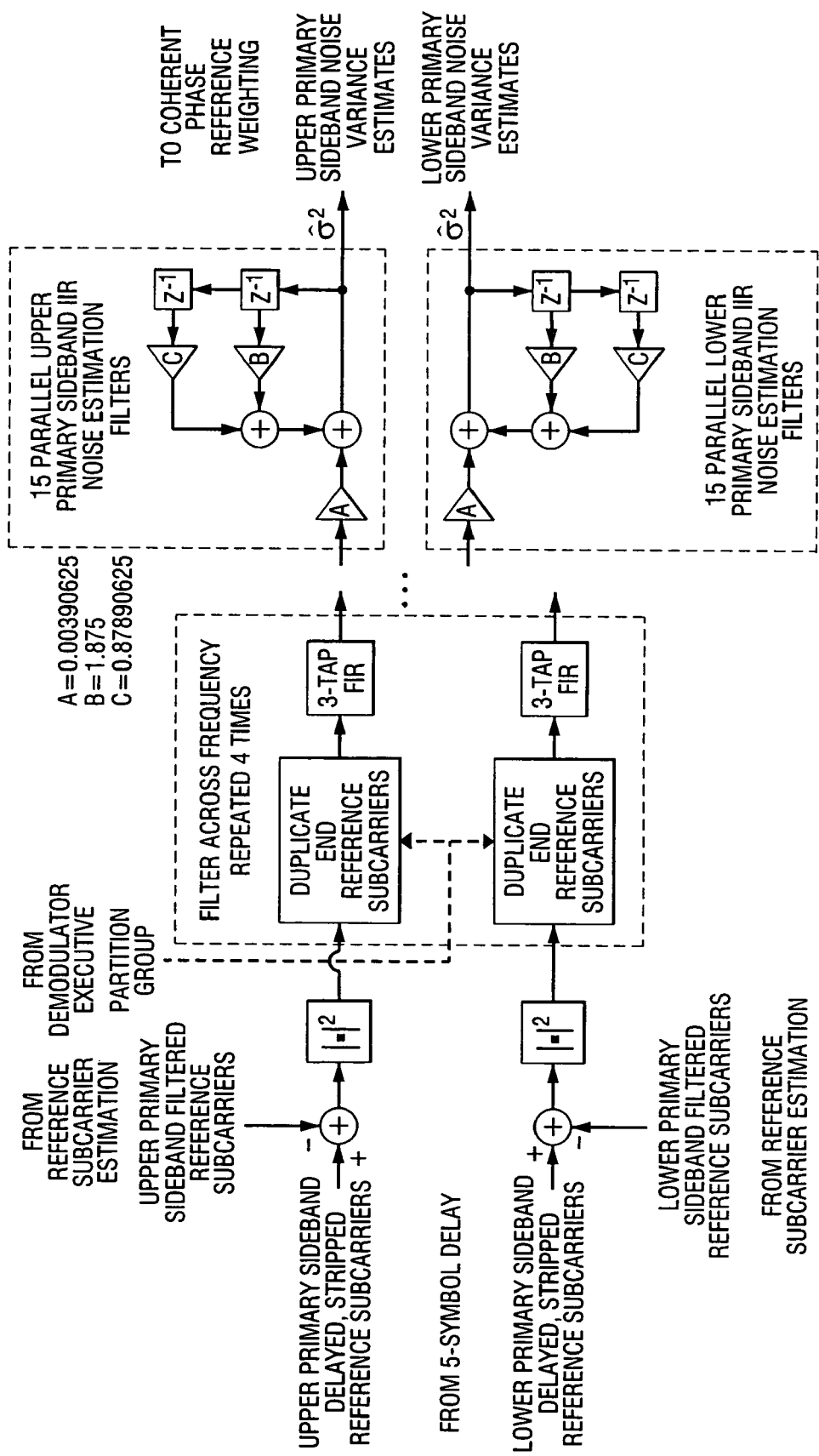
FIG. 16 is a block diagram of the Primary Sideband Noise Variance Estimation.
Figure 17:
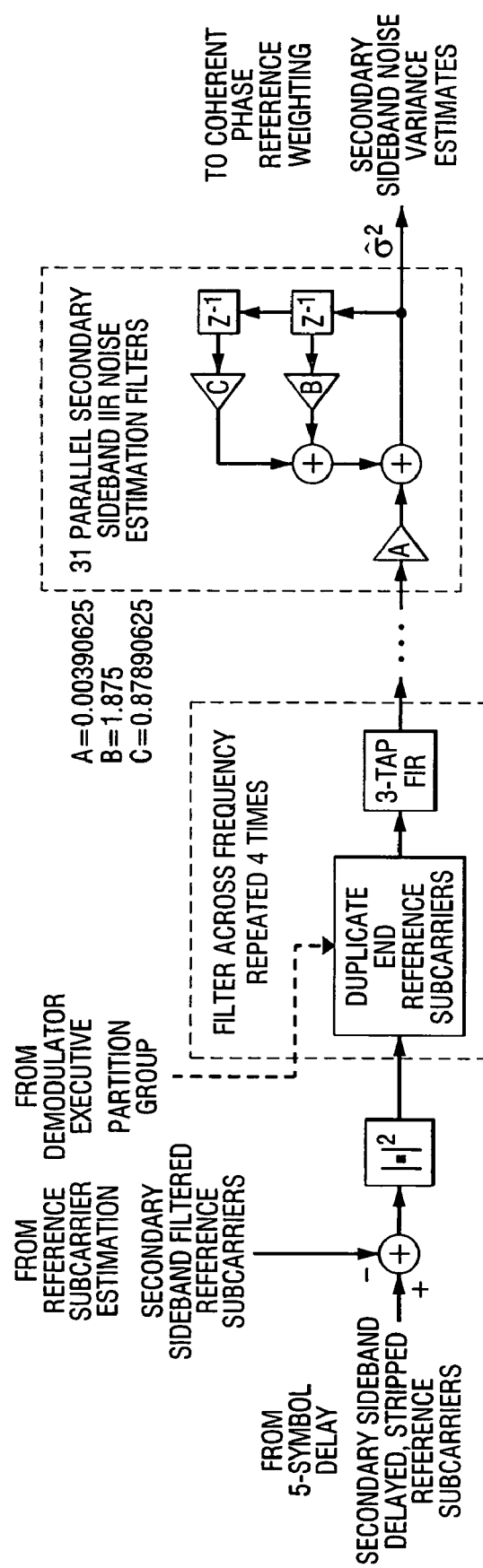
FIG. 17 is a block diagram of the Secondary Sideband Noise Variance Estimation.

Detailed block diagrams of the noise variance estimation process for the primary and secondary sidebands are shown in FIGS. 16 and 17, respectively. FIG. 16 is a block diagram of the Primary Sideband Noise Variance Estimation. FIG. 17 is a block diagram of the Secondary Sideband Noise Variance Estimation.

The subtraction and magnitude squared operations for each reference subcarrier in OFDM symbol n are described by the following equation:

$$z[n]=|x[n-5]-y[n]|^2$$

where $z[n]$ is the noise variance sample, $y[n]$ is the filtered reference subcarrier, and $x[n-5]$ is the stripped reference subcarrier that has been delayed by five symbols to account for the delay of the time-domain FIR filter in the reference subcarrier estimation component.

The filtering across frequency operation is identical to that used in the reference subcarrier estimation component. The IIR filtering operation is as follows for each reference subcarrier in OFDM symbol n:

$$\hat{\sigma}^2[n]=A\cdot v[n]+B\cdot\hat{\sigma}^2[n-1]+C\cdot\hat{\sigma}^2[n-2]$$

where $\hat{\sigma}^2[n]$ is the output noise variance estimate for OFDM symbol n, and $v[n]$ is the input frequency-filtered noise variance estimate. The filter coefficients are calculated based on a two-pole lossy integrator with $\alpha=1/16$:

$$A=\alpha^2=0.00390625$$

$$B=2\cdot(1-\alpha)=1.875$$

$$C=-(1-\alpha)^2=-0.87890625$$

The coherent phase reference weighting component calculates and applies CSI weights to each filtered reference subcarrier. These CSI weights, which estimate the signal-to-noise ratio of each reference subcarrier, are eventually applied to each data subcarrier to improve the performance of the Viterbi decoder. Since the magnitude of the filtered reference subcarriers represents signal power, the CSI weight is calculated and applied simply by dividing each filtered reference subcarrier by its corresponding noise variance estimate. The magnitude of the resulting complex reference subcarrier is the CSI weight, and the angle is the coherent phase reference. The implementation of this component is described below.

The filtered reference subcarriers are delayed by 16 symbols to account for the delay of the IIR filter in the noise variance estimation component. To prevent division by zero, a small bias is first added to the noise variance estimates. The delayed, filtered reference subcarriers are then weighted by the reciprocal of their corresponding noise variance estimates, producing CSI-weighted coherent phase references for each reference subcarrier in the primary and secondary sidebands.

Figure 18:
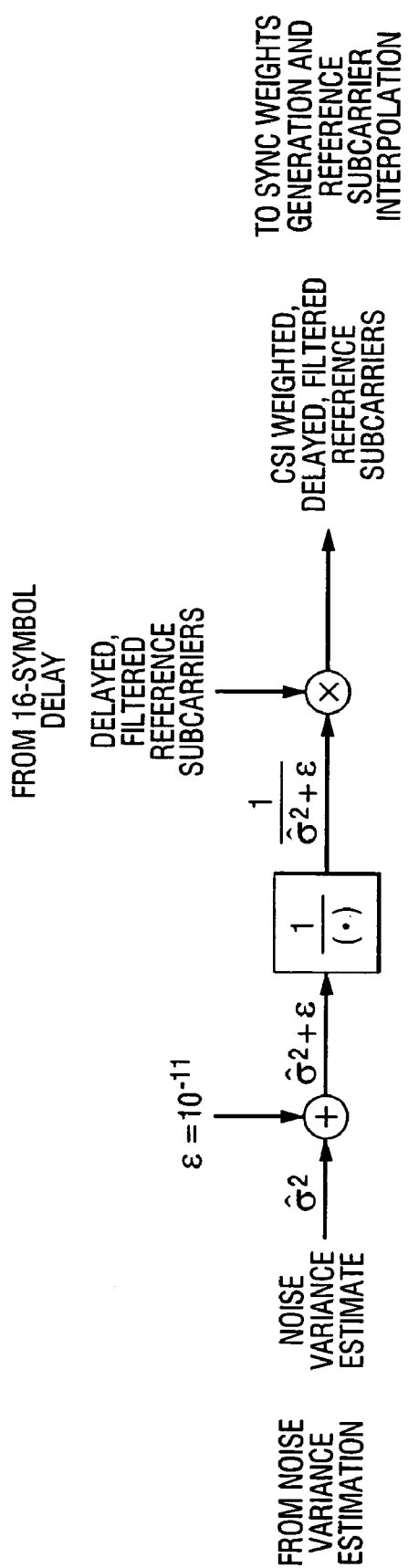
FIG. 18 is a block diagram of the CSI Weighting of Reference Subcarriers.

FIG. 18 is a block diagram of the CSI Weighting of Reference Subcarriers. The CSI weighting operation is as follows for each reference subcarrier in OFDM symbol n:

$$w[n]=\frac{x[n-16]}{\hat{\sigma}^2[n]+\varepsilon}$$

where $w[n]$ is the output CSI-weighted reference subcarrier for OFDM symbol n, $\hat{\sigma}^2[n]$ is the input noise variance estimate, $x[n-16]$ is the input delayed, filtered reference subcarrier, and $\varepsilon=10^{-11}$ is the bias added to prevent division by zero. The CSI weighting operation is identical for all sidebands.

Sync weights are simply CSI weights that have been averaged over a long time period to remove the effects of signal fades. The tracking control module uses sync weights to form tracking corrections for its symbol tracking loop.

Sync weights are generated for each OFDM symbol by calculating the magnitude of each CSI-weighted, filtered reference subcarrier in the primary sidebands, and smoothing the result with an IIR filter. There are a total of 30 separate IIR filters (one for each reference subcarrier). The IIR filters are unity-gain, two-pole lossy integrators that average the input CSI weights over a long duration. They are executed once per OFDM symbol time.

All 30 sync weights are always generated, even in service modes which do not populate the extended sidebands. This is acceptable because the CSI weights (and therefore sync weights) of the extended subcarriers are automatically minimized if they are not present.

Figure 19:
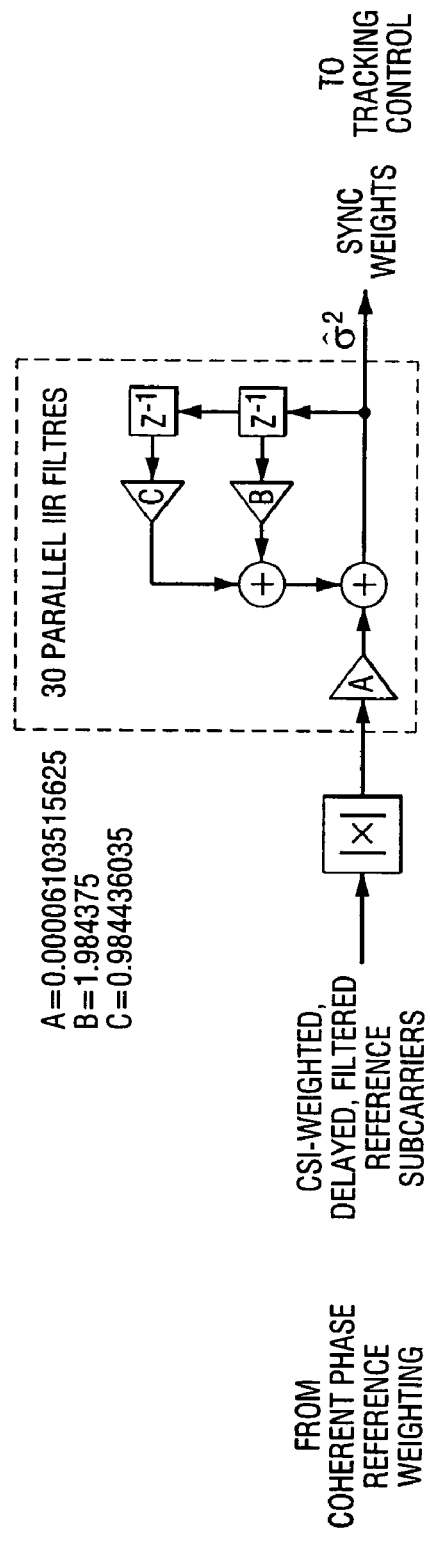
FIG. 19 is a block diagram of the Sync Weights Generation.

FIG. 19 is a block diagram of the Sync Weights Generation. The complex magnitude of each CSI-weighted primary reference subcarrier in an OFDM symbol is calculated as follows:

$$w=\sqrt{x_i^2+x_q^2}$$

where $x_i$ and $x_q$ are the real and imaginary portions of the input CSI-weighted, filtered reference subcarrier, and $w$ is the associated CSI weight.

The IIR filtering operation is as follows for each primary reference subcarrier in OFDM symbol n:

$$y[n]=A\cdot w[n]+B\cdot y[n-1]+C\cdot y[n-2]$$

where y[n] is the output sync weight associated with a particular reference subcarrier in OFDM symbol n, and w[n] is the input CSI weight. The filter coefficients are calculated based on a two-pole lossy integrator with $\alpha = 1/128$:

$A = \alpha^2 = 0.00006103515625$ $B = 2 \cdot (1-\alpha) = 1.984375$ $C = -(1-\alpha)^2 = -0.984436035$ The sync weights generation operation is performed only on the primary sidebands.

The reference subcarrier interpolation component applies the CSI-weighted coherent phase references to each data subcarrier. A coherent phase reference is generated for each data subcarrier by interpolating between the reference-subcarrier coherent phase references. The resulting data-subcarrier coherent phase references are then multiplied by the corresponding data subcarriers to produce coherently-detected, CSI-weighted, complex soft decisions.

For the primary sidebands, the CSI-weighted, filtered reference subcarriers are passed through a frequency-domain filter that has an interpolation factor of 19. This interpolation filter is a 37-tap FIR that "slides" across all active reference subcarriers. Since it does not filter over time, the interpolation filter operates only on data from a single OFDM symbol.

The interpolation process first inserts 18 complex zeros in the locations between each filtered reference, thereby effecting an interpolation factor of 19. In addition, 18 zeros are added before the first reference subcarrier and after the last reference subcarrier, to properly initialize the filter. The FIR filter then operates on the zero-filled data. As it "slides" across frequency, there will be—at most—two references (nonzero inputs) within the filter at a time. When the filter is centered on a reference, there is only one reference within the filter, and it is aligned with the center tap. In this case, the filter simply returns the input reference subcarrier, which is later discarded.

Figure 20:
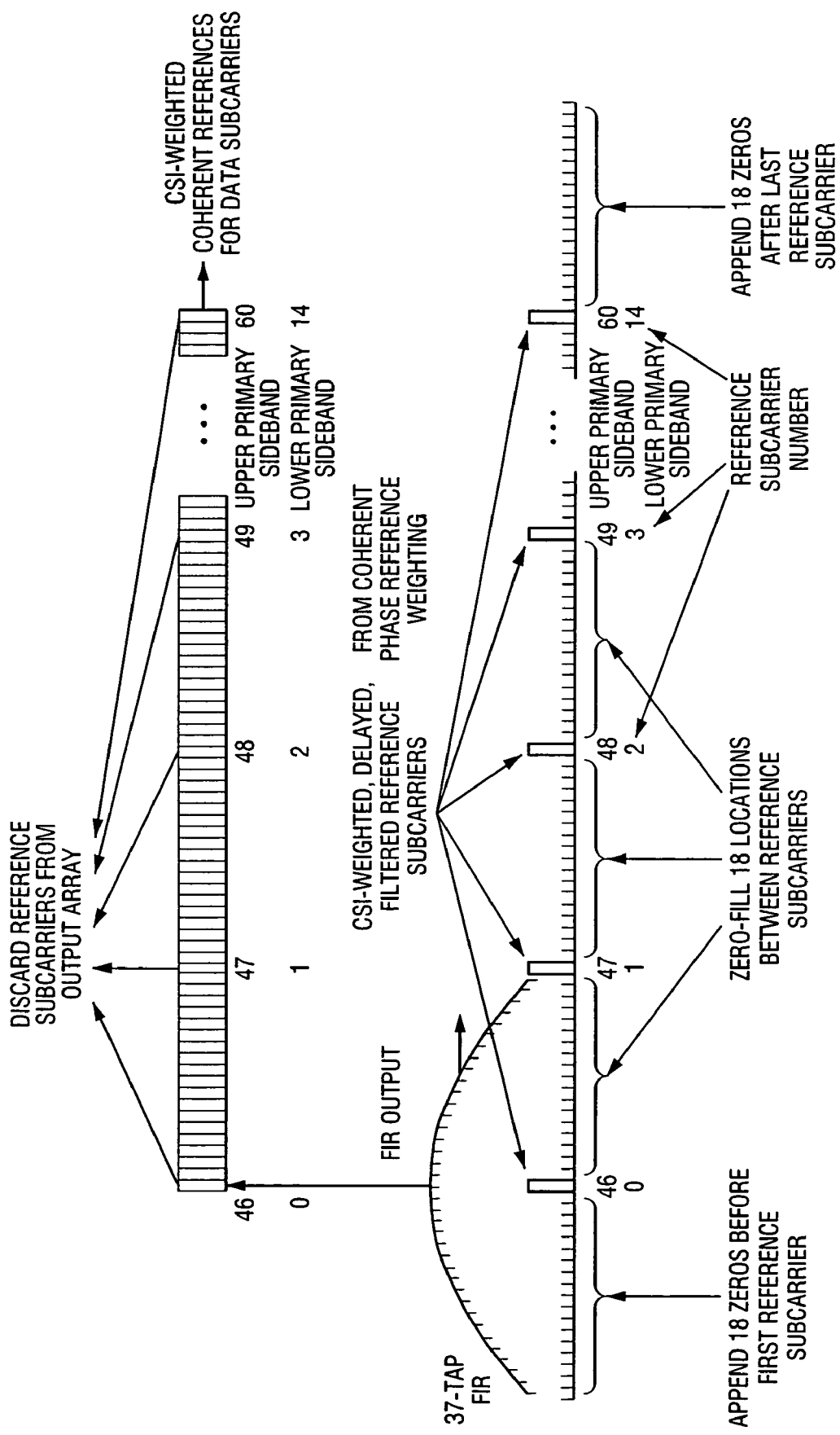
FIG. 20 is a schematic representation of a Reference Subcarrier Interpolation Illustration for Primary Sidebands.

FIG. 20 is a schematic representation of a Reference Subcarrier Interpolation Illustration for Primary Sidebands. The interpolation filtering for the secondary sidebands is performed in a similar manner.

Once a symbol has been filtered, the reference subcarriers are discarded from the output, leaving only CSI-weighted coherent phase references for each data subcarrier. The interpolated phase references are then multiplied by their corresponding equalized data subcarriers to create the output soft decisions. Prior to the complex multiplication, the phase-equalized data subcarriers must be properly aligned with the interpolated phase references. This is accomplished by delaying the phase equalized data subcarriers by 21 symbols. The delay accounts for the total delay introduced by the reference subcarrier time-domain FIR filter (5 symbols) and the noise-variance estimation IIR filter (16 symbols).

Figure 21:
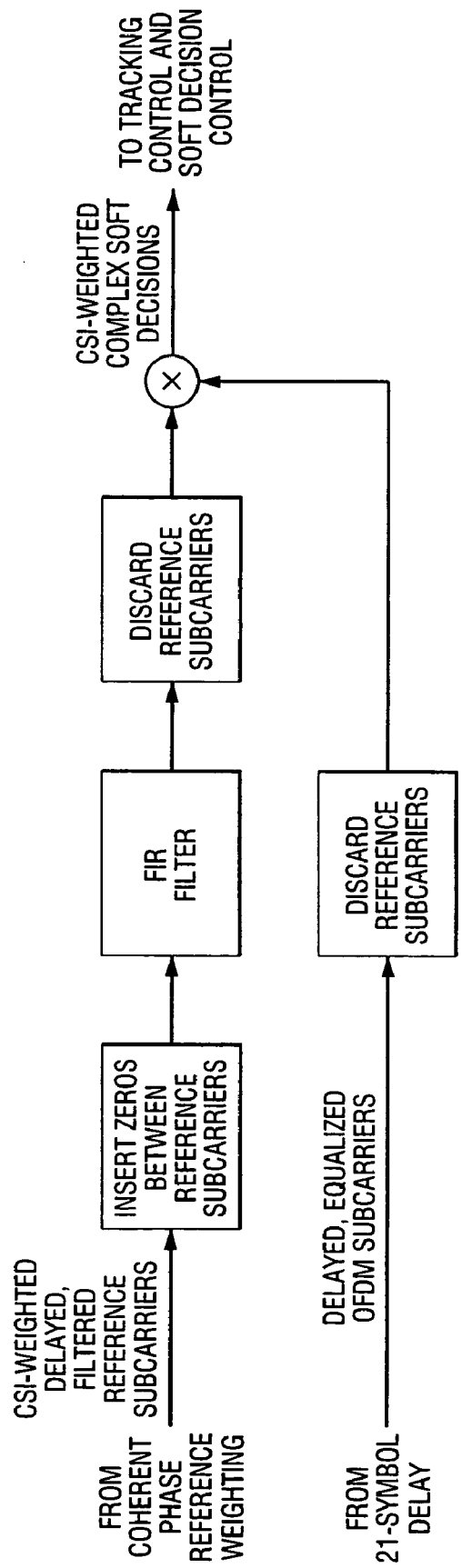
FIG. 21 is a block diagram of a Reference Subcarrier Interpolation.

FIG. 21 is a block diagram the Reference Subcarrier Interpolation process. The interpolation filtering operation is as follows for each subcarrier n within an OFDM symbol:

$$y[n] = \sum_{k=0}^{K-1} x\left[n + k - \frac{(K-1)}{2}\right] \cdot h[k]$$

where $$x\left[n + k - \frac{(K-1)}{2}\right]$$

is the zero-filled input for OFDM subcarrier $$n + k - \frac{(K-1)}{2},$$

y[n] is the interpolated coherent phase reference for OFDM subcarrier n, h[k] is the FIR filter coefficient array, and k is the filter summation index. The number of filter taps K is 25 for the secondary protected sidebands, and 37 for all other sidebands.

Soft-decision Viterbi decoding with weighting for maximum ratio combining (MRC) for coherently detected QPSK subcarrier symbols is employed to minimize losses over the channel. Since the interference and signal levels vary over the subcarriers (frequency) and time due to selective fading, timely CSI is needed to adaptively adjust the weighting for the soft-symbols used as branch metrics in the Viterbi decoding. The CSI estimation technique should be designed to accommodate a fading bandwidth of up to about 13 Hz for maximum vehicle speeds in the FM band around 100 MHz. A delay spread of several microseconds is typical, although larger spreads have been measured in some environments. The technique for estimating both the phase reference and the CSI from the Reference Subcarriers is illustrated in FIG. 21. This CSI weight combines the amplitude weighting for MRC along with a phase correction for channel phase errors.

$$CSIweight = \frac{\hat{\alpha}^*}{\sigma^2},$$

where $\hat{\alpha}^*$ is an estimate of the complex conjugate of the channel gain and $\sigma^2$ is an estimate of the variance of the noise.

The operation of the CSI recovery technique of FIG. 21 assumes acquisition and tracking of the frequency of the subcarriers, and the symbol timing of the OFDM symbols. The frequency and symbol timing acquisition techniques exploit properties of the cyclic prefix. The frequency and symbol tracking is accomplished through observation of the phase drift from symbol to symbol over time or frequency (across subcarriers).

After acquisition of both frequency and symbol timing, synchronization to the Block Sync pattern of the BPSK Timing Sequence is attempted by cross-correlating the differentially detected BPSK sequence with the Block Sync pattern. The differential detection is performed over all subcarriers assuming that the location of the training subcarriers is initially unknown. A cross-correlation of the known Block Sync pattern with the detected bits of each subcarrier is performed. A subcarrier correlation is declared when a match of all 11 bits of the Block Sync pattern is detected. Block synchronization (and subcarrier ambiguity resolution) is established when the number of subcarrier correlations meets or exceeds the threshold criteria (e.g. 4 subcarrier correlations spaced a multiple of 19 subcarriers apart).

After Block Sync is established the variable fields in the BPSK Timing Sequence can be decoded. The differentially detected bits of these variable fields are decided on a majority vote basis across the training subcarriers such that decoding is possible when some of these subcarriers or bits are corrupted. The 16 Blocks within each Modem Frame are numbered sequentially from 0 to 15. Then the MSB of the Block Count field is always set to zero since the Block Count never exceeds 15. Modem Frame synchronization is established with knowledge of the Block Count field.

Figure 26:
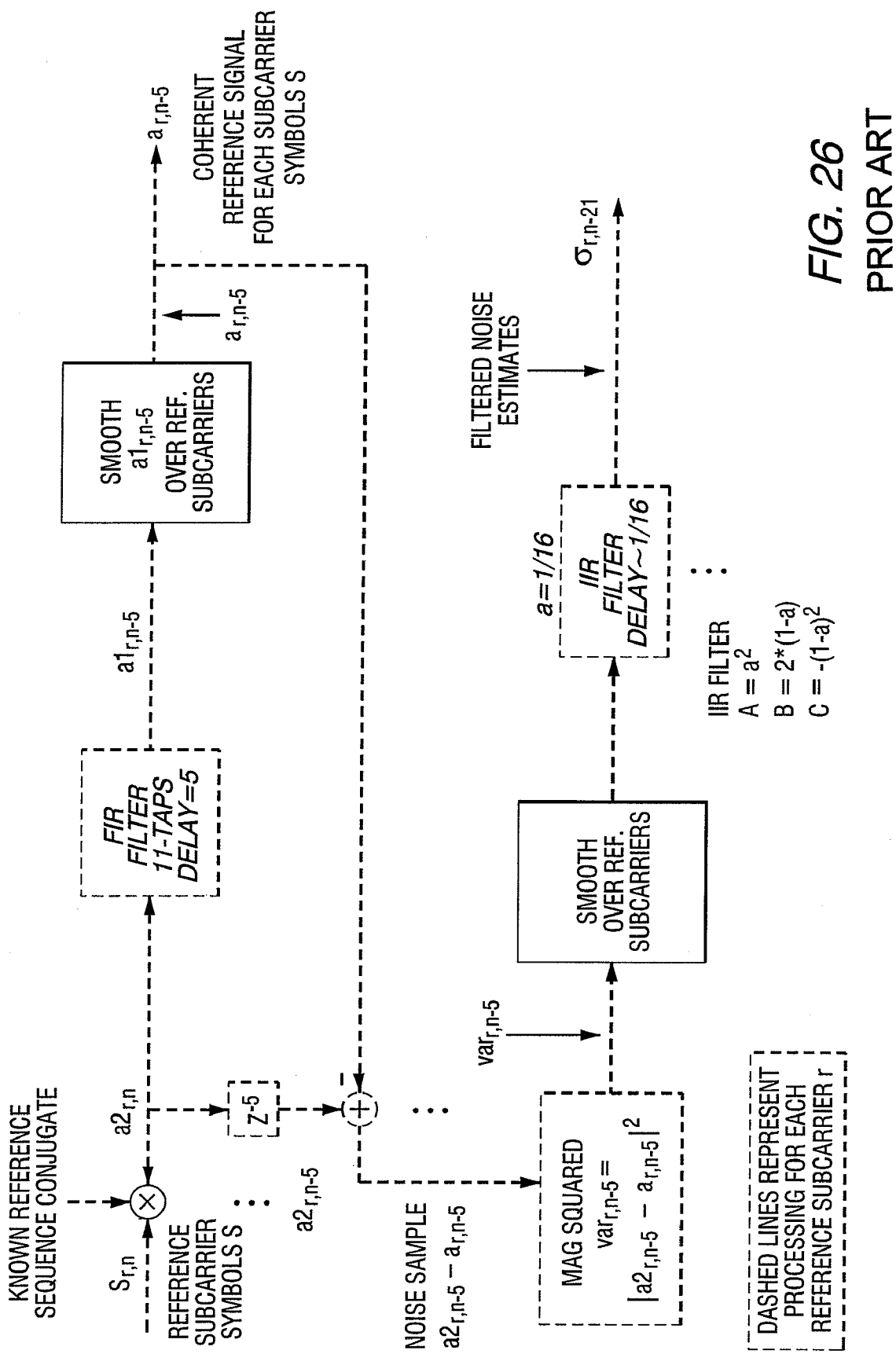
FIG. 26 is a block diagram of a previous coherent reference and noise estimation.

The coherent detection of this signal requires a coherent phase reference. The decoded information from the BPSK Timing Sequence is used to remove the modulation from the training subcarriers leaving information about the local phase reference and noise. Referring to FIG. 26, the binary (±1) Timing Sequence modulation is first removed from the received training subcarriers by multiplying them by the synchronized and, decoded, and differentially-reencoded BPSK Timing Sequence. A FIR filter is used to smooth the resulting symbols over time, yielding a complex conjugated estimate of the local phase and amplitude. This value is delayed and multiplied by an estimate of the reciprocal of the noise variance. The noise variance is estimated by subtracting the smoothed estimate of the local phase and amplitude from the input symbols (after appropriate time alignment), squaring and filtering the complex noise samples, then approximating the reciprocal (with divide-by-zero protection). This CSI weight is interpolated over the 18 subcarriers between pairs of adjacent training subcarriers. The resulting local CSI weights are then used to multiply the corresponding local data-bearing symbols.

The 11-tap FIR filter is used to estimate the complex coherent reference α at each subcarrier location. A larger FIR filter with more taps would reduce the estimation error when the signal statistics are stationary, but the bandwidth would be too small to track Doppler-induced changes in the signal at maximum highway speeds. Therefore 11-taps with a tapered symmetric Gaussian-like impulse response is appropriate. The symmetric FIR is used instead of an IIR filter for its linear phase property which has zero bias error for a piecewise linear (approximately) channel fading characteristic over the span of the filter. This smoothed coherent reference signal output of the FIR filter is subtracted from the delayed input samples to yield the instantaneous noise samples. These noise samples are squared and processed by an IIR filter to yield an estimate of the noise variance $\sigma^2$. This filter has a narrower bandwidth than the FIR filter to yield a generally more accurate estimate of the noise variance. After appropriate sample delays to match the filter delays, the symbol weight $\alpha^*/\sigma^2$ is computed for each subcarrier. These values are smoothed and interpolated across the subcarriers for each OFDM symbol to yield more accurate estimates. This weight is unique for each OFDM symbol and each subcarrier providing a local (time and frequency) estimate and weight for the symbols forming the branch metrics for a subsequent Viterbi decoder.

The system just described was designed to accommodate vehicles with fixed antennas. The multiple roles of the Reference Subcarriers for acquisition, tracking, estimation of channel state information (CSI) and coherent operation have been described. This system was designed for coherent operation in the FM broadcast band (88-108 MHz) with fading bandwidth to accommodate vehicles at highway speeds. The various coherent tracking parameters are estimated using filters with bandwidths that approximate the maximum expected Doppler bandwidth (roughly 13 Hz). With a fixed antenna, the pertinent tracking statistics of the input signal to the tracking algorithms are assumed to vary at a rate no greater than the Doppler bandwidth. However the use of switch diversity antennas in vehicle windows introduces abrupt transients in the coherent tracking of the digital signal, which degrades digital performance. An example of such an antenna switch diversity system is presented in U.S. Pat. No. 6,633,258.

Figure 22:
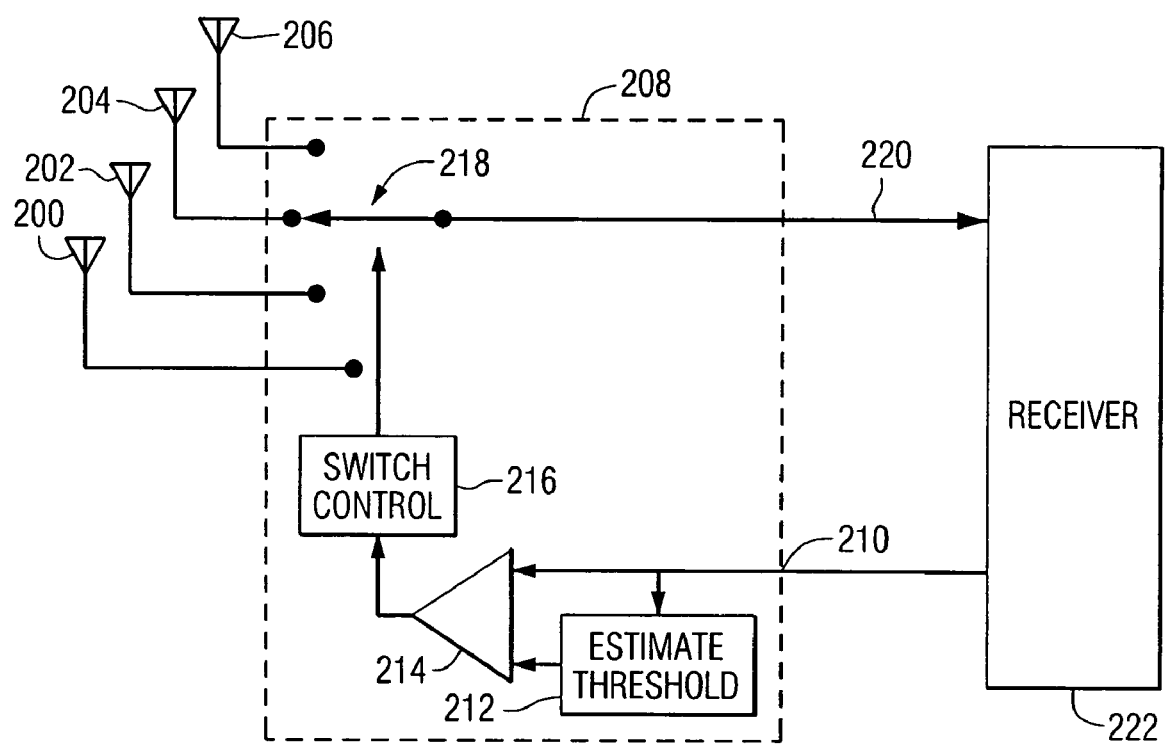
FIG. 22 is a functional diagram of a generic switch diversity antenna system.

The switch diversity antenna system includes multiple antenna elements (e.g., 2 to 4) usually placed within the glass of the front or back windows of a vehicle. These elements are connected to a diversity switch module which dynamically selects one or a combination of elements to provide an RF antenna signal to the receiver. A functional diagram of the diversity switch configuration is shown in FIG. 22. Multiple elements 200, 202, 204 and 206 are connected to a diversity switch module 208. The diversity switch module includes an input 210 for receiving a control signal. The control signal is compared to an estimated threshold as shown in block 212 and the control signal and results of the comparison are input to an amplifier 214. A switch control 216 responds to the amplifier output to control an antenna switch 218. This connects one of the antennas to the antenna input 220 of the receiver.

The diversity switch module monitors a signal from the receiver to determine when to switch. A typical module's "blind switching" algorithm establishes a switching threshold based on the average IF signal level from the receiver. When the IF signal falls below this threshold, the switch blindly selects an alternate element with the expectation of yielding a better signal. If the new signal is above a threshold, then the switch maintains the new element selection; otherwise, the diversity switch module selects an alternate element after dwelling a minimum amount of time. This process continues with the switch module continually updating its threshold(s).

FIG. 22 is a functional diagram of a generic switch diversity antenna system. The theory behind the operation of the diversity switch algorithm is based on the different instantaneous fading conditions of the various antenna elements. Multipath fading results in the addition of multiple rays (multipaths) of the signal arriving at the receiving antenna element at different times. For example a wavelength at 100 MHz is approximately 10 feet. If two signal paths arrive at a time differential of 1 wavelength or 10 nanoseconds (10 feet propagation difference), then the signals will add in-phase. Similarly if the two rays arrive at the antenna element with a time differential of a half wavelength, then the added out-of-phase signals will cancel. This addition or cancellation is dynamic in a moving vehicle where the Doppler bandwidth is approximated by $BW=f_c*speed/c$ ($f_c$ is the carrier frequency, speed of the vehicle, c is the speed of light). The Doppler bandwidth is roughly 10 Hz at typical highway speeds. Therefore the signal vector (complex version of magnitude/phase) of one antenna element can vary at a rate of approximately 10 Hz in this example. Then coherent tracking of the reference signal and channel state must accommodate a 10 Hz bandwidth to maintain coherent signal tracking.

Figure 23:
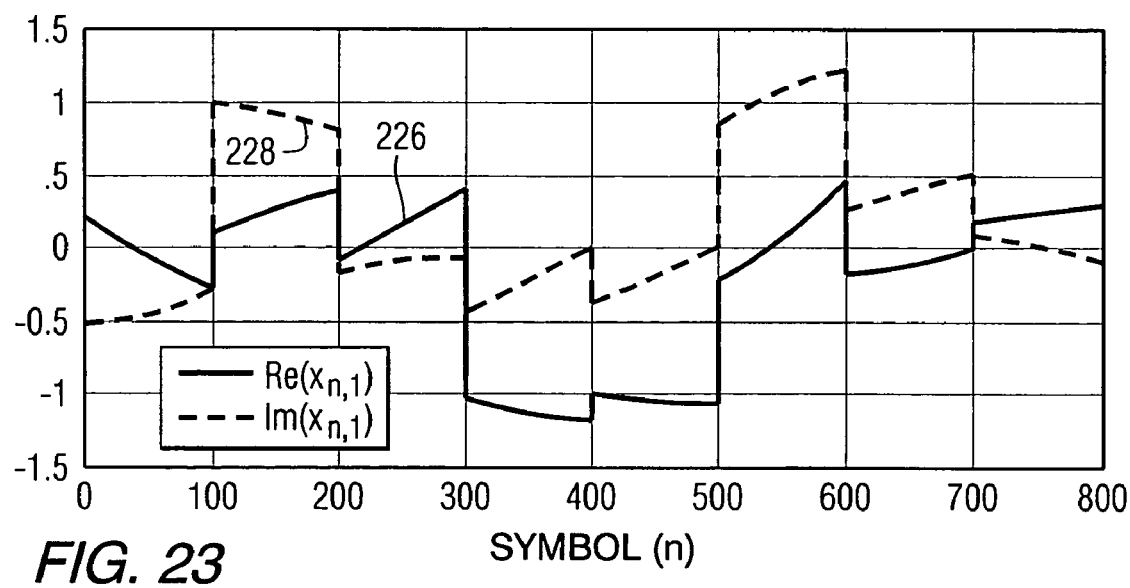
FIG. 23 is a graph of Real and Imaginary components of a (noiseless) fading signal switched every 100 symbols.

Typical antenna elements in a vehicle can experience somewhat independent instantaneous fading conditions (depending on spacing of the elements and the directions of the multiple paths). For example one element is in a fading null while another element is at a maximum. In a vehicle with several elements, it is likely that an alternate element will receive a sufficiently higher signal while the present element is experiencing a fade (signal cancellation). Typical elements in a multi-element FM diversity antenna system will have instantaneous fading conditions that may be somewhat correlated, but sufficiently uncorrelated to achieve the desired diversity gain to improve performance. FIG. 23 is a graph of Real 226 and Imaginary 228 components of a (noiseless) fading signal where the antenna element is switched every 100 symbols.

For this example it can be assumed that the switching time of a diversity switching module is on the order of 10 microseconds, while the minimum dwell time is on the order of 10 milliseconds. The switching time of 10 microseconds has no audible affect on the demodulated FM signal, but the overall FM diversity improvement can be substantial since signal fades are avoided. However the switching transient does adversely affect the coherently-tracked digital signal. The objective here is to find a coherent tracking method which accommodates the switching transients in the switch diversity antenna system.

The problem can be summarized as follows: The antenna module switching causes a step transient in the coherent signal while the signal immediately before or after the transient is approximately coherent. Finite impulse response (FIR) filtering across the step transient distorts the estimated coherent channel reference $\alpha$ (from FIG. 4) affecting a span of samples equal to the FIR filter length (11 taps). This distortion in the coherent channel reference increases the magnitude of the noise samples from the subtraction of this reference from the input samples. Although the noise is increased in the vicinity of the transient, the infinite impulse response (IIR) filter spreads out this noise peak over the span of the IIR filter. This has the effect of underestimating the noise variance in the immediate vicinity of the transient, while overestimating the noise variance over the time span of the IIR filter not in the immediate vicinity of the transient. Both the distorted coherent channel reference and the noise variance errors contribute to the degradation of the digital signal.

Figure 24:
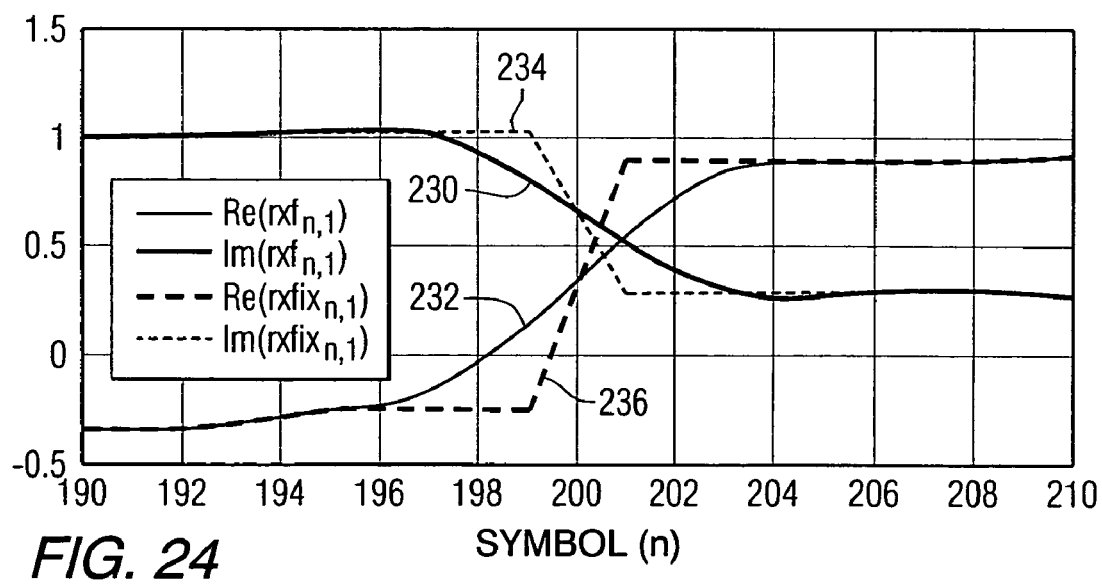
FIG. 24 is a graph of Real and Imaginary components of the filtered coherent reference fading signal switch in the vicinity of a transient at symbol 200 with 10 dB SNR.

FIG. 24 is a graph of Real and Imaginary components of the filtered coherent reference fading signal switch in the vicinity of a transient at symbol 200 with 10 dB SNR. FIG. 24 shows the estimated coherent reference signal in the vicinity of a switch step transient. The solid lines 230 and 232 are the smoothed complex channel gain values ($\alpha$) and show the effect of the 11-tap FIR filter where the reference signal is distorted in the vicinity of the transient. The FIR filter has the effect of smoothly interpolating (distorting) the samples on either side of the switch transient. The dashed lines 234 and 236 show a better estimate of the coherent signal where only the symbol experiencing the transient is affected.

Figure 25:
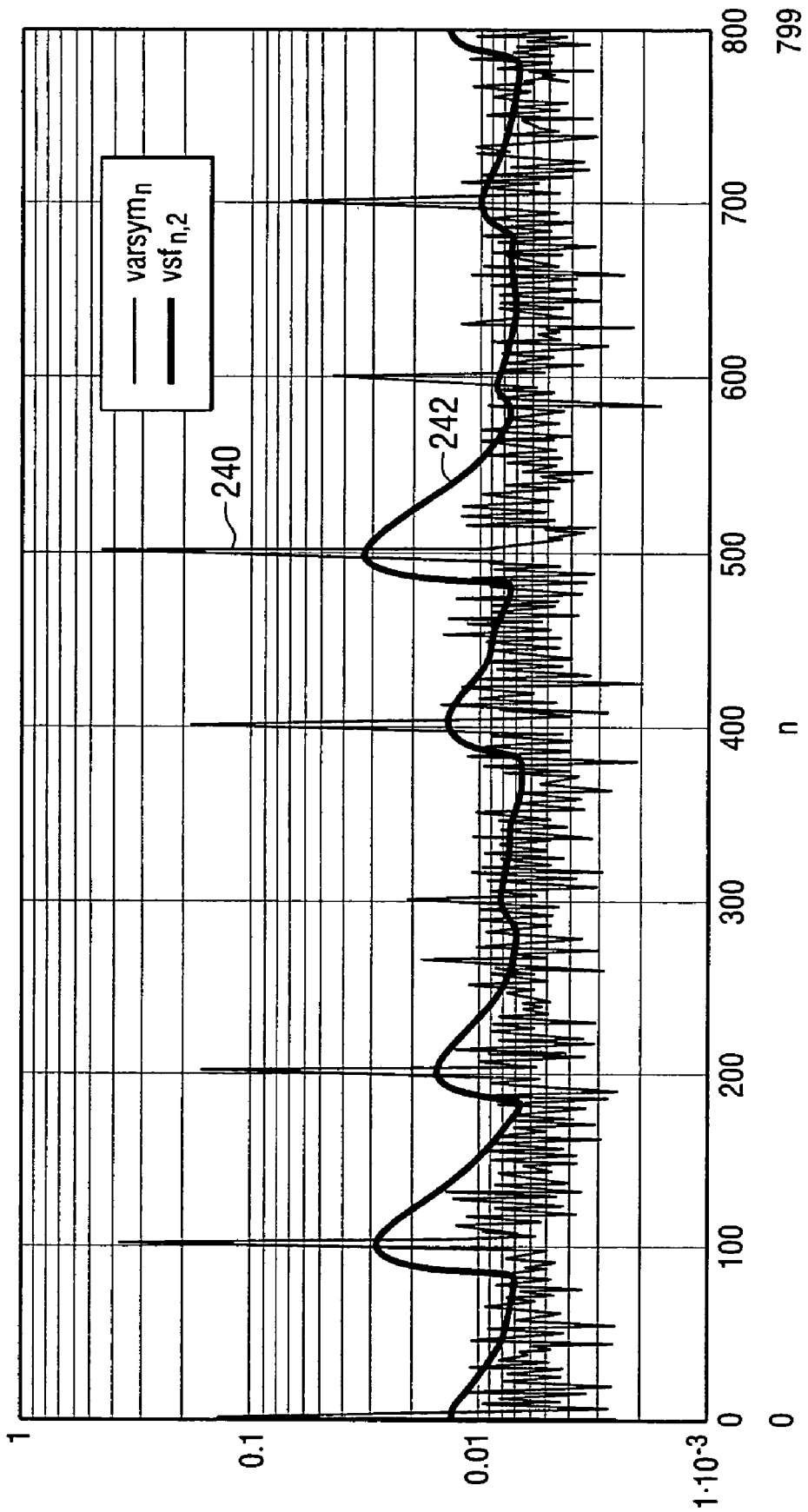
FIG. 25 is a plot showing the effects of switch transients on the noise estimates (20 dB SNR).

FIG. 25 is a plot showing the effects of switch transients on the noise estimates (20 dB SNR). Dashed line 240 is the noise sample input to the IIR filter and solid line 242 is the filtered output. The input noise samples (squared) can be shown to increase in the immediate vicinity of the transient. This is actually due to the distortion of the coherent channel reference due to the 11-tap FIR filter. Although the IIR output responds to the noise peaks, these peaks are suppressed locally to the transient, but spread over the duration of the IIR filter. These errors in the local noise variance estimation contribute to degraded digital performance.

The solution can be summarized as follows: Coherent tracking can be achieved on either side (in time) of a switching transient as previously shown in FIG. 24. The coherent estimation filters cannot use signal samples that straddle the transient, so the tracking filters can use only signal samples up to (not including) the transient from either time direction.

One possible method for correcting the step transient error involves identification of the time location of the signal transient. This method was the subject of the parent patent application (U.S. patent application Ser. No. 10/715,582). Although it should be possible (in theory) to explicitly communicate the switching instant to the receiver modem, this may not be practical. It is preferable for the modem to reliably detect the transient within the coherent tracking algorithms. The coherent tracking algorithms can be modified in the vicinity of the transient to provide approximately coherent tracking in the immediate vicinity of the transient, except for the symbol where the transient occurred. It is worth noting that the error in the noise variance estimate is due to the error in the coherent channel reference.

The complexity of the transient detection algorithm, and the degradation due to false detection of transients has prompted the development of a much simpler algorithm which resulted in better performance.

In an average white Gaussian noise (AWGN) channel, linear filtering of the coherent channel reference and noise estimation yields near optimum results. The type of linear filter and the time span of the filter are dependent on the fading statistics, and more specifically the autocorrelation function of the parameter of interest. A symmetrical 11-tap FIR filter approximating this autocorrelation function at highway speeds was chosen in the original design as a reasonable compromise between reducing the estimation error (variance) and the agility of the estimate to track the parameter in fading. An IIR filter was used to estimate the noise variance since linear phase is not an issue with the noise. Both of these estimation filters were enhanced through further filtering across the subcarriers in frequency using an effective frequency span which accommodates the selective fading environment (frequency autocorrelation). These filters yield good results in the AWGN channel, fading, and assuming a reasonably slow automatic gain control (AGC) function which should be slower than the fading dynamics. FIG. 26 is a block diagram of a previous coherent reference and noise estimation.

Some automobile receivers employ diversity switched antennas and faster AGCs. The coherent reference and noise estimation filters are no longer appropriate for these applications. Furthermore the interference from first-adjacent FM signals is not AWGN, and has a more impulsive-like characteristic, so some improvement may be gained through appropriate modifications of the estimation filter techniques. The transient detection and subsequent adjustment of the coherent reference, along with a modification to the noise estimation were first attempts at solving this issue. However, improved and simpler methods have been devised, and are the subject of this invention.

It is well-known that median filtering, instead of linear (FIR or IIR) filtering, is a method of reducing the estimation noise while preserving step changes in the estimation parameters(s) and also reducing the effects of impulsive noise. This median filtering can conveniently replace the transient detection and coherent reference adjustment of the previously proposed solution. Some important characteristics of the median filter are analyzed and described here to assess suitability for use in the receiver system.

One important characteristic of the median filter is the reduction of the estimation error variance of the coherent reference and noise. This reduction is compared to the original filters and further compared to the Cramer-Rao bound, which is the lowest possible estimation error for any filter (linear or nonlinear) of a given number of samples (filter taps). The estimation error applies only to AWGN noise for this case.

The original 11-tap FIR filter used to estimate the coherent reference signal is analyzed first. The 11 filter taps are normalized such that their sum is unity, yielding a dc gain of one.

Figure 27:
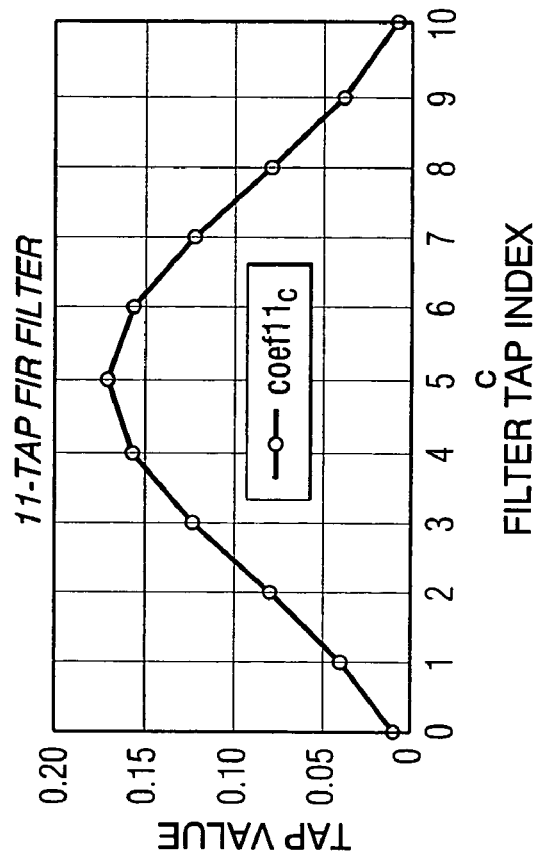
FIG. 27 is a plot of an 11-tap FIR filter for coherent reference estimation of a single reference subcarrier.

FIG. 27 is a plot of an 11-tap FIR filter for coherent reference estimation of a single reference subcarrier.

Figure 28:
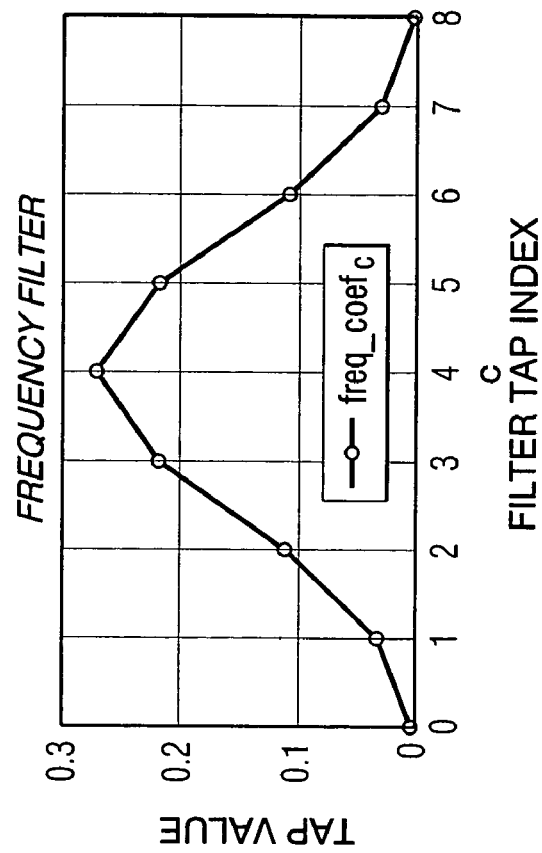
FIG. 28 is a plot of a filter used across frequency (Reference Subcarriers).

The filter used to smooth the estimates across the Reference Subcarriers is described next. This filter has 9 taps (effective) which are normalized such that their sum is unity, yielding a dc gain of one. The filtering near the subcarriers at the end extremes of the upper or lower digital sidebands is not exact due to the truncation of the filter span at the endpoints. This filter is defined in FIG. 28. FIG. 28 shows a plot of a filter used across frequency of the Reference Subcarriers.

The reduction of the estimate error is compared next. The ratio of the variance of the filter output samples to the variance of the input samples, assuming a constant parameter corrupted by AWGN, is equal to the sum of the squares of the normalized filter coefficients, $$\text{var\_reduction} = \sum_n coef_n^2,$$

The variance reduction of the 11-tap FIR filter is 0.127, or about −9 dB. Similarly the reduction of the 9-tap FIR filter across frequency is 0.196, or about −7 dB. The error-reduction performance of these filters can be compared to median filters and the Cramer-Rao bound.

$$\sigma_{\alpha,output}^2 \geq \frac{-1}{D\left\{\frac{\partial^2 \ln[p(r/\alpha)]}{\partial \alpha^2}\right\}}$$

For samples of a constant (over the span of the filter with N taps) parameter α corrupted by AWGN, the log-likelihood function is $$\frac{\partial \ln[p(r/\alpha)]}{\partial \alpha} = \frac{N}{\sigma^2}(\hat{\alpha} - \alpha),$$

And the resulting Cramer-Rao bound for a constant parameter in AWGN becomes simply $$\sigma_{\alpha,output}^2 \geq \frac{\sigma^2}{N}.$$

Figure 29:
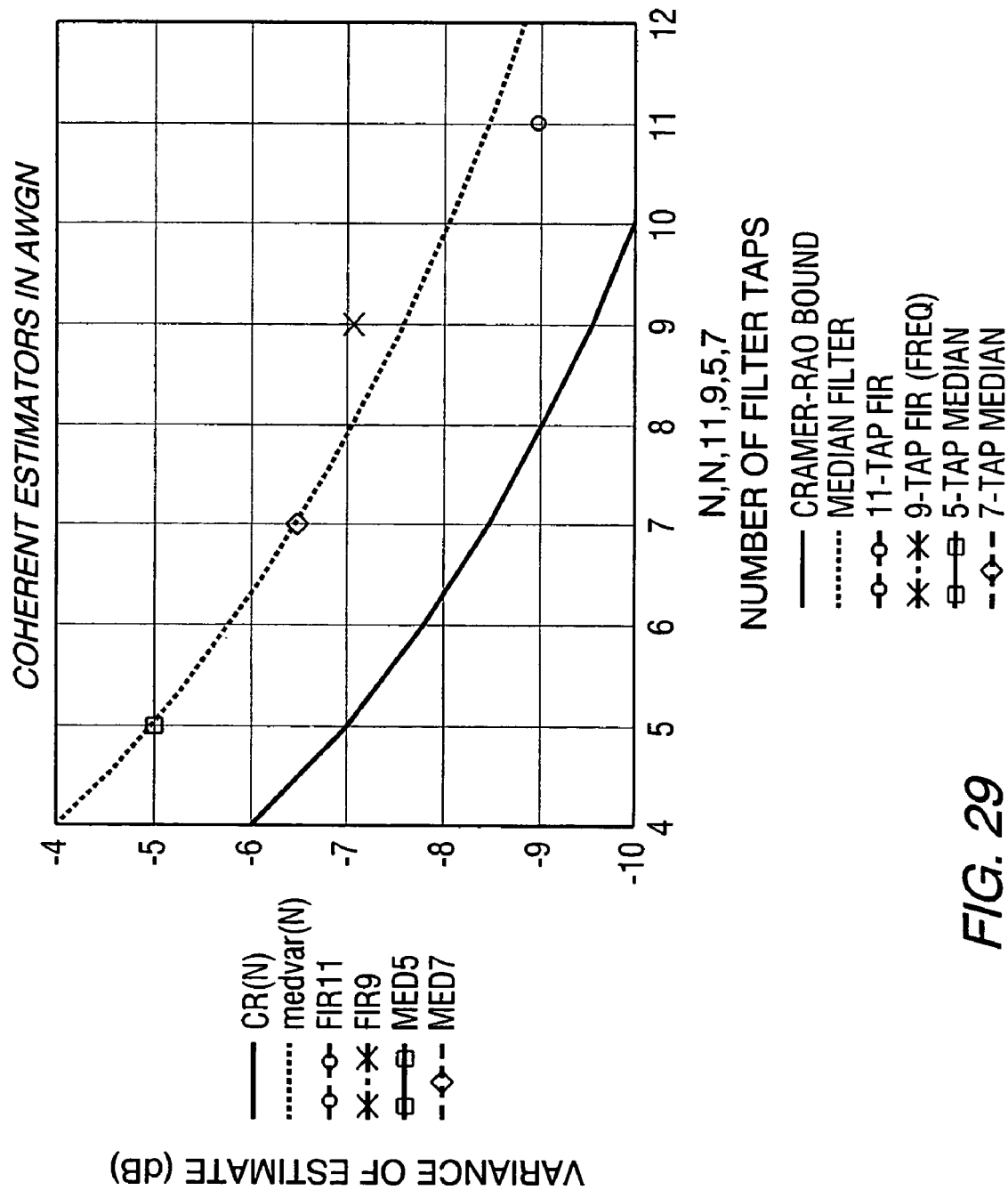
FIG. 29 is a plot of the effects of filter type on reduction of estimation error for coherent reference signal.

Then the theoretical minimum variance for a filter with N taps is simply the input variance divided by the number of taps. This would suggest that the minimum variance estimate could be achieved with equal (uniform) tap weights; however, this would not perform well in fading. FIG. 29 is a plot of the effects of filter type on reduction of estimation error for coherent reference signal.

Although the median filter has an increase in error variance of about 2 dB relative to the Cramer-Rao bound in AWGN, the actual bell-shaped FIR filters offer performance closer to the median filters for the same number of taps. For noise distributions that are more heavy-tailed or impulsive-like than Gaussian noise, the median filter performance increases while the linear filter performance is the same. For example with Laplacian noise, the median filter performance is 3 dB better in reducing the error variance than a linear filter with equal taps. Of course the Cramer-Rao bound for this new case is no longer met with a uniform-tap FIR filter.

The performance degradation in AWGN due to these filters can be approximated by computing the additional noise (estimation error variance) over the actual symbol noise variance during detection of each symbol. The 9-tap frequency spanning filter is used independently of the 11-tap FIR of median filtering in time. The 9-tap frequency filter does not affect the step response (in time) due to switching. The losses for the original 11-tap FIR filter and a 7-tap and 5-tap median filters are tabulated as follows:

| Filter type | 11-tap FIR | 5-tap Median | 7-tap median |
| --- | --- | --- | --- |
| Error variance | 0.127 | 0.314 | 0.224 |
| With 9-tap freq filtering (0.196) | 0.026 | 0.062 | 0.044 |
| Loss in AWGN | 0.11 dB | 0.26 dB | 0.19 dB |

Figure 30:
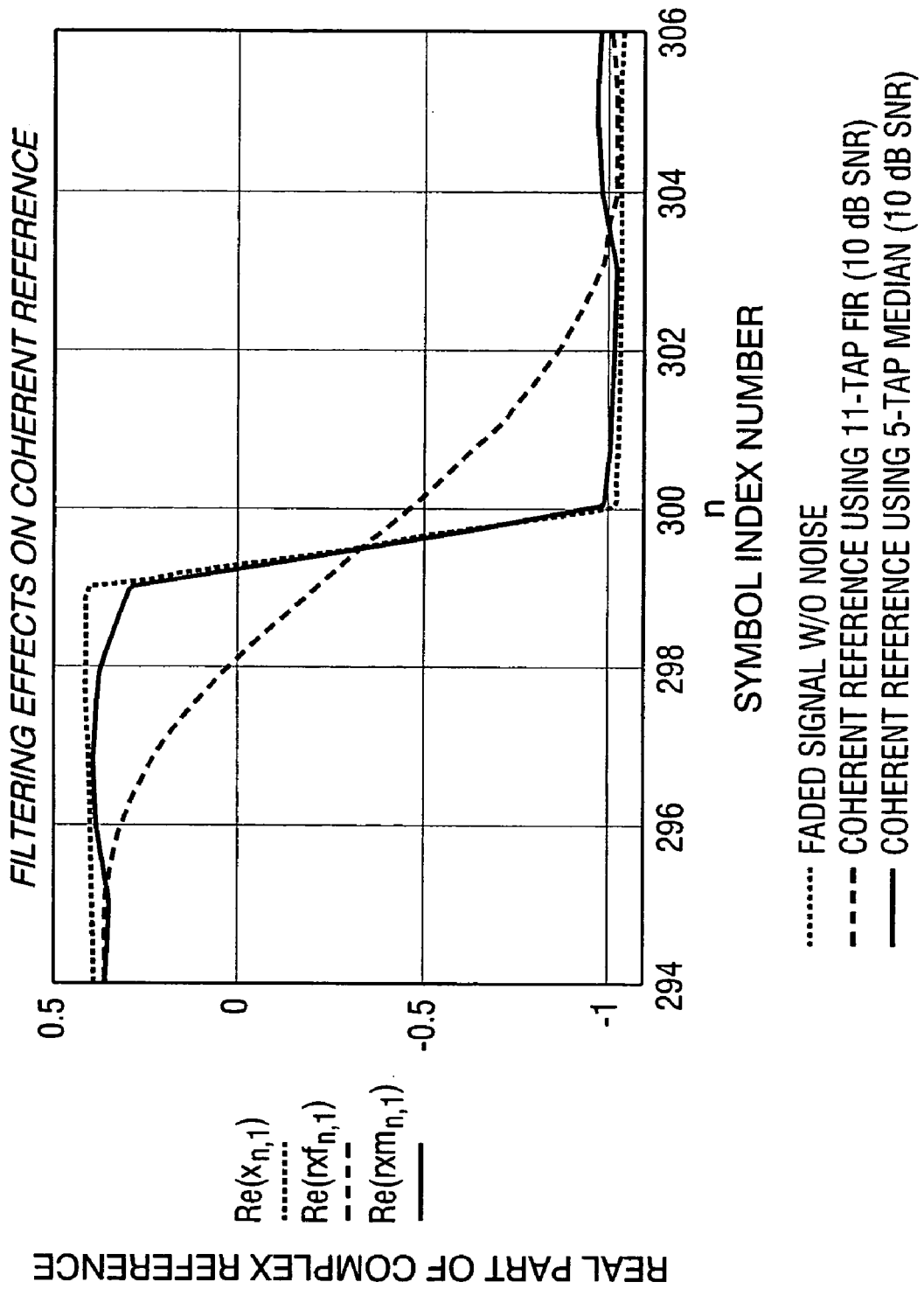
FIG. 30 is a plot of a comparison of 11-tap FIR vs. median filtering of a coherent reference signal.

FIG. 30 is a plot of a comparison of 11-tap FIR vs. median filtering on coherent reference signal. Although a small loss in AWGN performance is expected using the median filter, the improved step response for antenna switching is obvious from the plot of FIG. 30. Notice that the step response is significantly improved without the need for transient detection. A functional diagram of the new coherent reference and noise estimation processing is shown in FIG. 31, where the 11-tap FIR filter is replaced with a 5-tap median filter.

Figure 31:
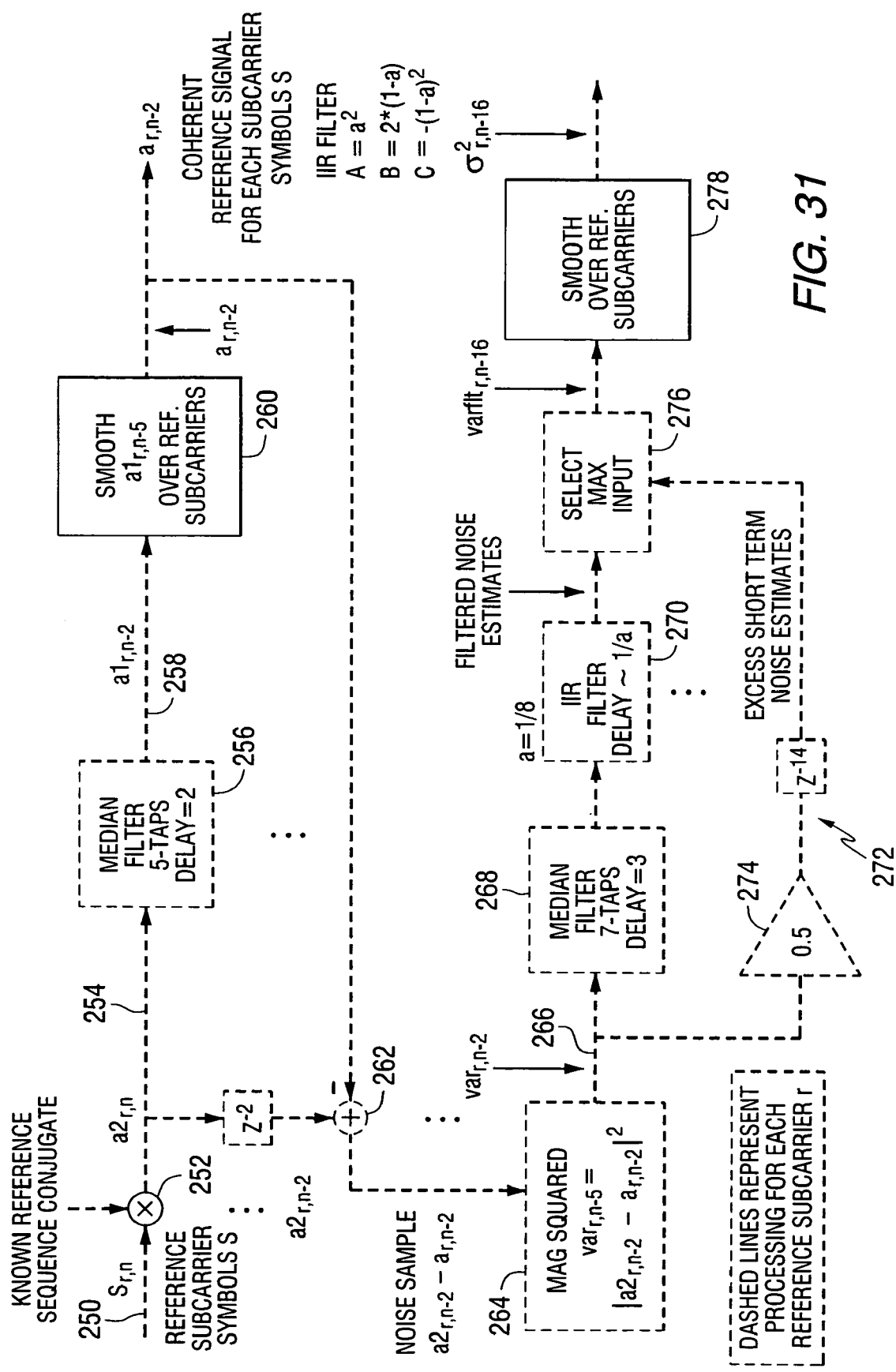
FIG. 31 is a block diagram of the reference and noise estimation of the present invention.

A brief description of the functions and algorithms of FIG. 31 are presented next. The goal of the process(es) shown here is to provide estimates of the coherent channel complex gain ("a" values) along with estimates of the noise or interference. These estimates are local in time and frequency (subcarrier location) to accommodate the dynamic selective fading channel experience in a mobile environment such as a moving automobile. These estimates are derived from the reference subcarrier symbols which have been stripped from the received and demodulated signal as previously described, and are input on line 250 as $S_{r,n}$ complex values. The data used to modulate these symbols is already known and removed from these symbols with the first conjugate multiply operation (illustrated by multiplier 252) to yield the instantaneous complex channel gain values $a2_{r,n}$ on line 254. The subsequent median filtering 256 in time reduces the noise while maintaining the step changes due to antenna switching to produce intermediate values $a1_{r,n}$ on line 258. These intermediate values are further filtered (smoothed) over the reference subcarriers (in frequency) as shown in block 260 to produce the final complex channel gain values $a_{r,n}$. These $a_{r,n}$ gain values are later used outside this algorithm to process (equalize and provide branch metric information) the signal constellations for the data bearing symbols in the conventional manner for QAM symbol demodulation.

The next step in this process is to estimate the noise associated with each of these complex channel gain values. The instantaneous noise samples are estimated by subtracting the $a_{r,n-2}$ values from the (appropriately delayed) noisy corresponding input samples $a2_{r,n-2}$, as illustrated by summation point 262. As shown in block 264, the magnitude-squared values is computed from these complex noise samples to yield the instantaneous noise variance estimates $var_{n-2}$ on line 266. These instantaneous noise variance samples are poor estimates of the local (time and frequency) noise and require processing and filtering to produce useful noise variance estimates. Although simpler time and frequency filtering would normally be used to reduce the error of these instantaneous noise variance estimates, this type of filtering would not effectively accommodate the changing noise due to fading, AGC action and step changes due to antenna switching. Therefore a median filter 268 is used to filter these instantaneous variance samples in time to produce samples varflt$_{n-16}$, and conventional (linear IIR or FIR filter 270) filtering is used to further smooth across frequency (subcarriers) to produce the final variance estimates $\sigma^2_{r,n-16}$ in a manner similar to the complex channel gain estimates above. An additional feed forward path 272 is provided to capture the relatively large noise impulses that occur due to the antenna switching. When these values (scaled by a factor 0.5 as shown in block 274) exceed the median-filtered estimate, then these larger values are selected for output to the frequency smoothing filter by the select max function illustrated in block 276. These values are then smoothed over the reference subcarriers as shown in block 278. This is important in subsequent formation of the branch metrics which exploits this knowledge of the large noise impulses.

Analyses and simulation of the algorithm improvements to the coherent reference estimation just described appear to work sufficiently well for the cases analyzed and simulated. These cases include a flat and selective fading channel with Doppler bandwidth consistent with highway speeds and noise as low as 0 dB SNR. However other channel conditions should be considered, such as impulsive noise, or residual transient effects not entirely suppressed by the new coherent reference processing. In this case the adjusted coherent reference values of x are appropriate; however, the noise variance estimate would be corrupted. The noise impulse could be high for the symbol(s) where the impulse occurred, but the IIR filter would suppress this noise estimate value at the impulse instant, and spread the noise estimate over the impulse response time of the IIR filter. It would be preferable in this case to feed-forward the high noise samples in parallel with the IIR path (with appropriate delay matching). For symbols where the noise pulse is sufficiently higher than the IIR filter output, this noise pulse should be used to determine the estimated noise variance for those symbols. When the feed-forward path is used for these noise pulses, the energy into the IIR filter for these samples should be reduced so that the local noise peak is not spread over the span of the IIR filter. It is easy to consider several variations of this process for handling noise peaks in the noise variance estimate.

Figure 32:
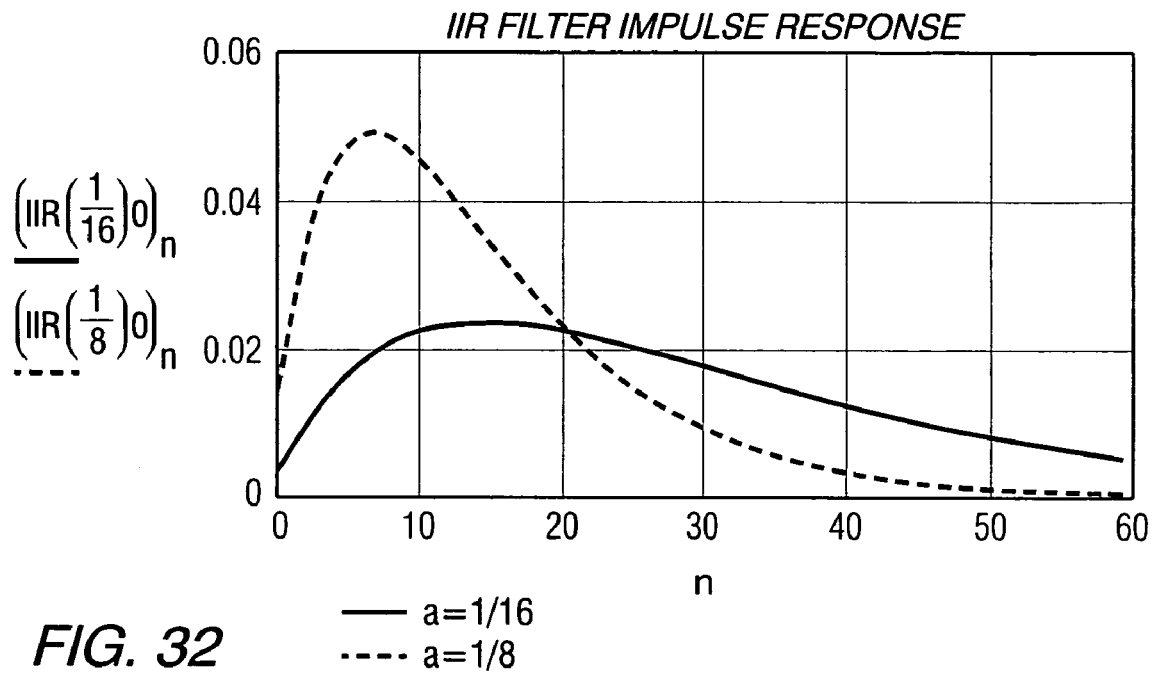
FIG. 32 is a plot of impulse response of the IIR filter.

The noise variance estimation process is modified to improve performance with switching transients and to accommodate a faster AGC. The original noise estimation employed a 2-pole IIR filter with parameter a=1/16 (not to be confused with the subscripted "a$_{r,n}$" value notations for the complex channel gains). The peak of the impulse response of this filter was at a delay of 8 samples (symbols), although the decaying tail was much longer making the step delay closer to 16 samples (symbols). FIG. 32 shows that the new modification changes the IIR filter parameter a=1/8. Other modifications to the noise estimate include moving the frequency filtering from before the IIR filter, to after the IIR filter. The IIR filter is also preceded by a 7-tap median filter and includes an excess noise feedforward path. Both these new additions are designed to better accommodate switching transients and impulsive-like noise, while accommodating a faster AGC function in the front-end or IF section of the receiver.

The 7-tap median filter is used to preprocess the noise-squared samples prior to linear IIR filtering and filtering over frequency (Reference Subcarriers). In this case the median filter produces a biased estimate of the variance due to the asymmetric probability density function (pdf) property of the noise-squared samples. This bias can be adjusted for subsequent operation in the noise estimation process. Specifically each input sample x to the median filter is assumed to consist of the sum of a pair (complex) of the squares of zero-mean Gaussian noise samples, where x=v$^2$+w$^2$. The Gaussian pdfs of noise samples u and v are:

$$p(u) = p(v) = \frac{\exp\{-v^2/2\sigma^2\}}{\sigma\sqrt{2\pi}};$$

$$p(u \cdot v) = \frac{\exp\{-(u^2+v^2)/2\sigma^2\}}{2\pi\sigma^2};$$

The cumulative distribution function of x can be found with a change of variables and integrating as follows:

$$P(x) = \iint\limits_{u^2+v^2 \le x} p(u,v) \cdot du \cdot dv = 1 - \exp\{-x/2\sigma^2\}.$$

Then the power density function (pdf) of x is found from differentiation of P(x).

$$p(x) = \frac{\exp\{-x/2\sigma^2\}}{2\sigma^2}; \text{ for } x \ge 0$$

The noise variance is defined as the mean of x.

$$\sigma_x^2 = \frac{1}{2\sigma^2}\int_0^\infty x \cdot \exp\{-x/2\sigma^2\}dx = 2\sigma^2$$

The median of x can be found by solving for medx in the following equation:

$$\frac{1}{2\sigma^2}\int_0^{medx} \exp\{-x/2\sigma^2\}dx = \frac{1}{2\sigma^2}\int_{medx}^\infty \exp\{-x/2\sigma^2\}dx$$

$$\exp\{-x/2\sigma^2\}|_0^{medx} = \exp\{-x/2\sigma^2\}|_{medx}^\infty$$

$$\exp\{-medx/2\sigma^2\} - 1 = -\exp\{medx/2\sigma^2\}$$

$$\exp\{-medx/2\sigma^2\} = 1/2; \text{ or } -medx/2\sigma^2 = \ln(1/2)$$

$$medx = 2\sigma^2 \cdot \ln(2)$$

The estimation bias factor of the median is found as the ratio of the median to the mean.

$$\text{med\_bias} = \frac{medx}{\sigma_x^2} = \frac{2\sigma^2 \cdot \ln(2)}{2\sigma^2} = \ln(2) \cong 0.693.$$

Therefore the median underestimates the Gaussian noise variance by a factor of ln(2). This bias should be accounted for when used to replace the mean estimate in the noise variance estimation process.

Scaling of the noise estimate due to the median bias factor would not generally be an issue if all the noise estimates for all the symbols presented to the Viterbi decoder were scaled by the same factor. However, the feedforward excess noise estimate path is just one example where the scaling does matter. Furthermore, nonlinearities in forming the branch metrics (e.g., fixed point quantization and overflow) may also have an effect.

The effects of reducing the time constant of the IIR filter in the variance estimation process are discussed next. Each output sample $y_n$ of the 2-pole IIR filter is a function of the new input sample $x_n$ and the 2 previous outputs.

$$y_n = \alpha^2 \cdot x_n + 2 \cdot (1-\alpha) \cdot y_{n-1} - (1-\alpha)^2 \cdot y_{n-2}$$

Figure 33:
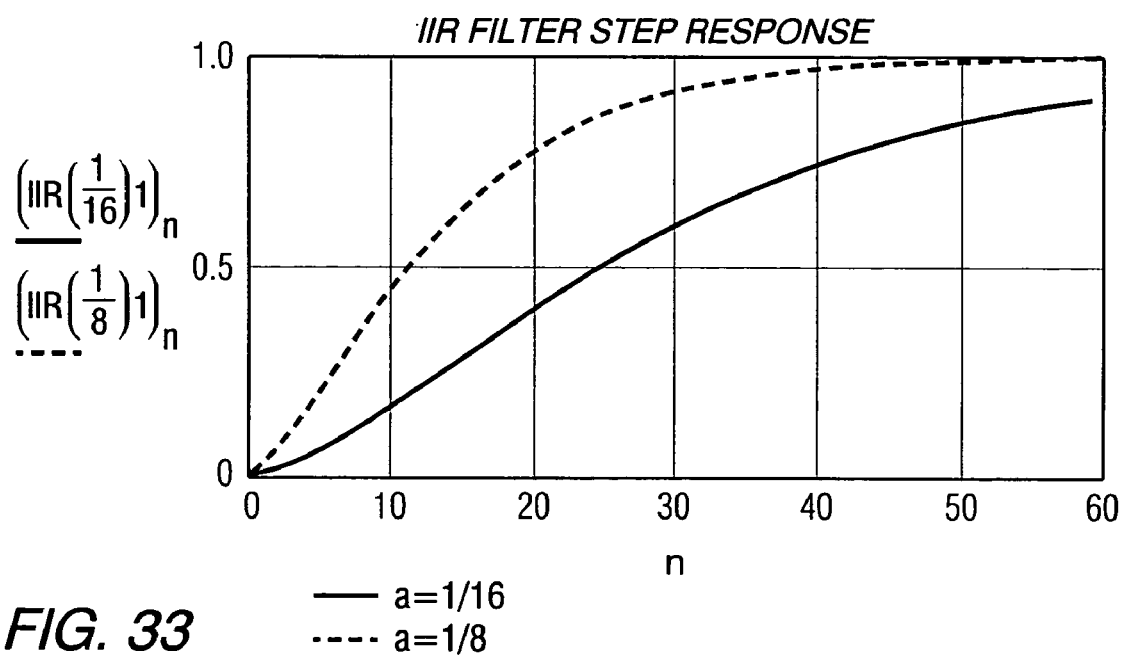
FIG. 33 is a plot of the step response of the IIR filter.

The filter expression has a dc gain of one, and its impulse response (time) depends upon the parameter $\alpha$. The peak of the impulse response (mode) occurs in half the time of the group delay, where the group delay is more indicative of the step response time. The mean and mode delays can be computed as a function of parameter $\alpha$. The impulse and steps responses of the IIR filter for $\alpha=1/16$ and $\alpha=1/8$ are shown in FIGS. 32 and 33. FIG. 32 is a plot of impulse response of the IIR filter. FIG. 33 is a plot of the step response of the IIR filter.

The effective delay of the filter should be at least the mode delay, but less than the group delay. This delay should be appropriately compensated when applying the noise estimates in forming the branch metrics.

$$\text{group\_delay} = \text{mean\_delay} = 2 \cdot \left(\frac{1}{a} - 1\right)$$

$$\text{mode\_delay} = \frac{1}{a} - 1$$

The Gaussian noise suppression ability can be assessed in a manner similar to the FIR filter where the variance reduction of the noise estimate from input to output is equal to the sum of the squares of the normalized filter coefficients (dc gain=1). Note that this variance reduction is associated with the error variance of the estimate of the noise variance, and not the reduction of the variance of the noise power. For the IIR filter, this computation is more conveniently performed on the z-transform of the filter impulse response, taking the limit for large N approaching a continuous spectrum, then applying Parseval's theorem. The z-transform of the IIR filter is $$H(n) = \frac{a^2}{1 - 2 \cdot (1-a) \cdot e^{-j \cdot 2\pi \cdot n/N} + (1-a)^2 \cdot e^{-j \cdot 4\pi \cdot n/N}},$$

and its magnitude is $$|H(n)| = \frac{a^2}{2 - 2 \cdot a + a^2 - 2 \cdot (1-a) \cdot \cos(2\pi \cdot n/N)}.$$

The variance reduction factor from input to output samples can be computed as $$\text{variance\_reduction\_factor} = \lim_{N \to \infty} \left\{\frac{1}{N} \cdot \sum_{n=0}^{N-1} |H(n)|^2\right\}$$

In the limit, the summation can be integrated as $$\text{variance\_reduction\_factor} = \frac{1}{2 \cdot \pi} \cdot \int_0^{2\pi} \frac{a^2}{2 - 2 \cdot a + a^2 - 2 \cdot (1-a) \cdot \cos(\phi)} d\phi$$

Then the variance reduction factor is found as a function of the IIR filter parameter $\alpha$ after integration.

$$\text{variance\_reduction\_factor} = \frac{a \cdot (2 \cdot a - 2 - a^2)}{(a-2)^3}$$

Figure 34:
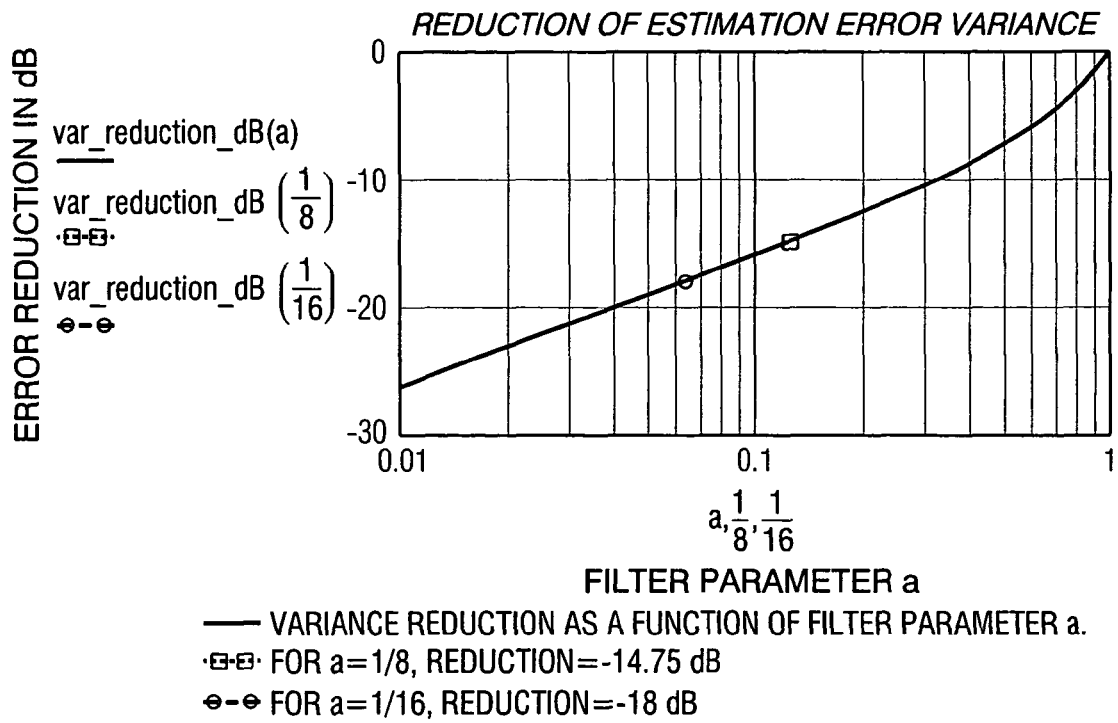
FIG. 34 is a plot of the reduction of error in noise estimation as a function of IIR filter parameter $\alpha$.

The variance reduction for AWGN achieved by the IIR filter is plotted versus parameter a in FIG. 34. FIG. 34 is a plot of the reduction of error in noise estimation as a function of IIR filter parameter $\alpha$.

The filtering across frequency provides another 7 dB in noise reduction for AWGN. In an AWGN stationary channel, a longer IIR time constant would be beneficial to reduce the noise estimate error; however, in a nonstationary channel with switching transients, and/or a faster AGC, a shorter time constant would be preferred. For the present system, the 7-tap median filter followed by an IIR filter with a=1/8 is preferred over the original design with a single IIR filter with a=1/16. This new filtering results in minimal degradation in a stationary AWGN channel while providing significantly improved performance in fading with a fast AGC, and diversity antenna switching transients. The resulting noise estimation error of only the IIR and frequency filters is then roughly 22 dB better than the variance of a single noise sample input to the filter. This results in a noise variance estimation error having a standard deviation of about 8% of the filter input noise variance, or equivalently averaging over 150 noise samples. This could have an effect similar to degrading the branch metrics used by the Viterbi decoder by roughly 0.33 dB in AWGN. The cascaded 7-tap median filter reduces this error even further, although its effect in AWGN is not easily computed. This compares to a degradation of roughly 0.16 dB in the original modem using a=1/16. However the motivation for the new noise estimation is for non-AWGN conditions.

In a purely AWGN channel an optimum receiver would not select the feedforward excess noise path, and the optimum noise filter would be linear (e.g., IIR or FIR), and span a long time period. The excess noise path is provided only to handle impulsive-like noise, or coherent reference errors due to switching transients, etc. In these cases the excess noise path mitigates the occasional effects of large noise bursts without contaminating the longer term variance estimates provided by the IIR filter. The feedforward excess noise path is scaled by G*ln(2), and a fraction of the noise input samples would exceed the mean and be selected by the "SELECT MAX INPUT" function in the noise estimate path. If the scaling is small, then the excess noise path would be selected less frequently and losses in the AWGN case would be minimized. The probability that the excess path is selected is approximately equal to the probability that the excess samples exceed the mean (assuming accurate mean filter).

$$\text{prob}(\text{excess} \cdot G > \text{mean}) = \frac{1}{2\sigma^2} \int_{2\sigma^2/G}^{\infty} \exp\{-x/2\sigma^2\} \cdot dx = e^{-1/G}$$

The average increase factor in noise estimation variance (in dB) due to selecting the excess path can be computed as $$\text{ratio\_dB}(G) = 10 \cdot \log\left(G \cdot e^{-1/G} \int_2^\infty x \cdot e^{-x/2} \cdot dx + (1 - e^{-1/G})\right);$$

$$= 10 \cdot \log\left(1 + e^{-1/G} \cdot \left(\frac{8 \cdot G}{e} - 1\right)\right)$$

Figure 35:
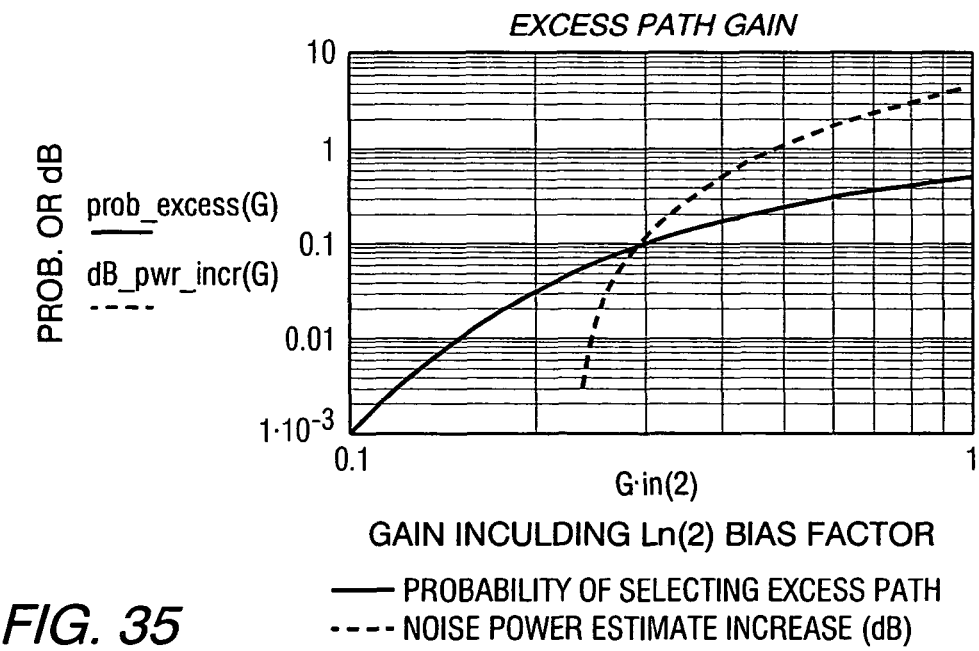
FIG. 35 is a plot showing effects of excess gain value $G*\ln(2)$ on probability of selecting the excess path, and increased average estimated noise variance.

FIG. 35 is a plot showing effects of excess gain value G*ln(2) on the probability of selecting the excess path, and the increased average estimated noise variance. A value of G*ln(2)=0.5 was empirically determined to be a reasonable compromise value for the excess noise gain. This value yields minimal losses in the AWGN case, but is also effective in minimizing losses due to switching transients. Furthermore, the performance with a fast AGC and/or first adjacent FM interference is improved.

Figure 36:
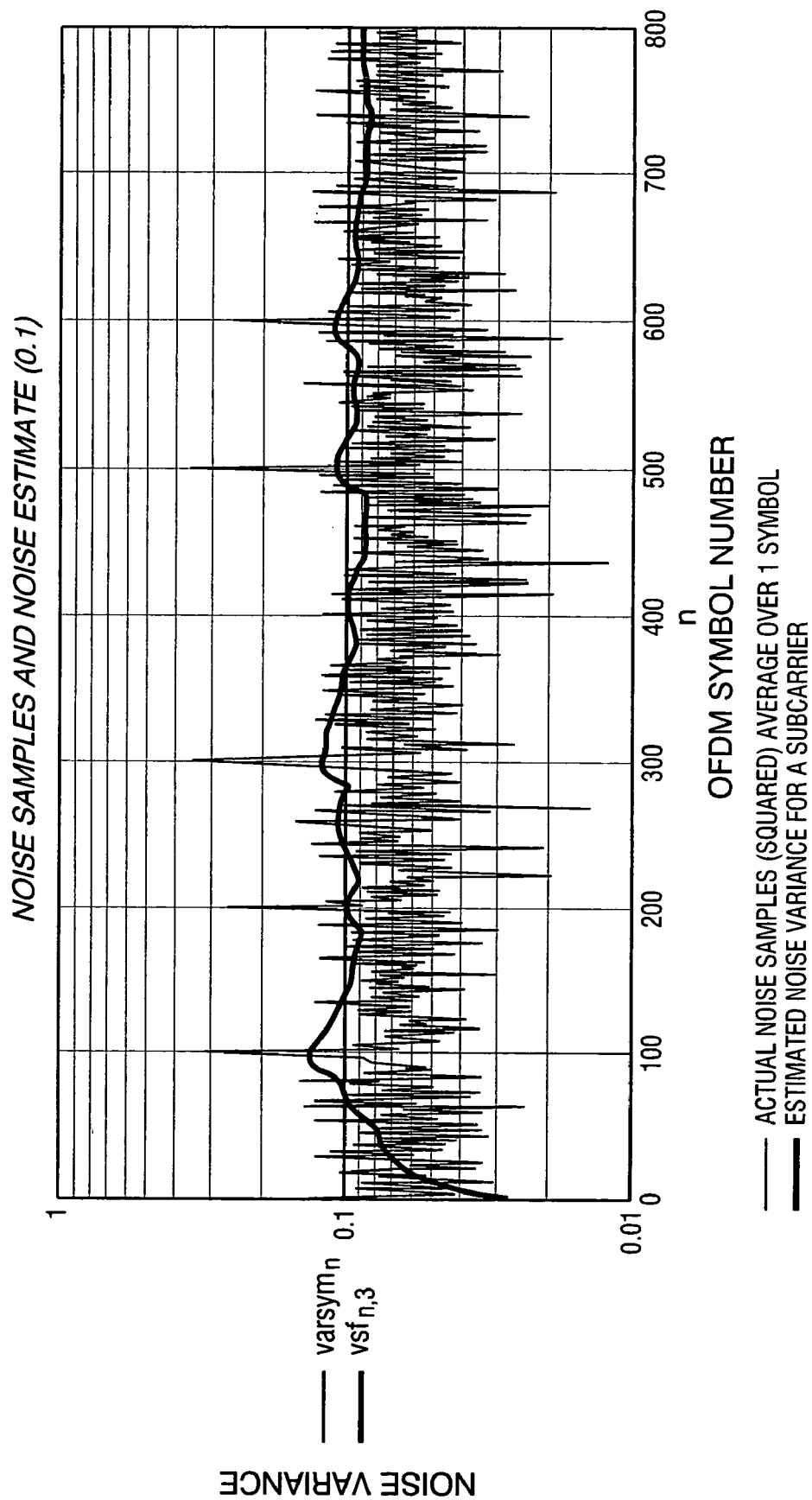
FIG. 36 is a plot showing the effects of switch transients on the noise estimates (10 dB SNR) with original 11-tap FIR filter and original IIR noise estimation with $\alpha=1/16$.
Figure 37:
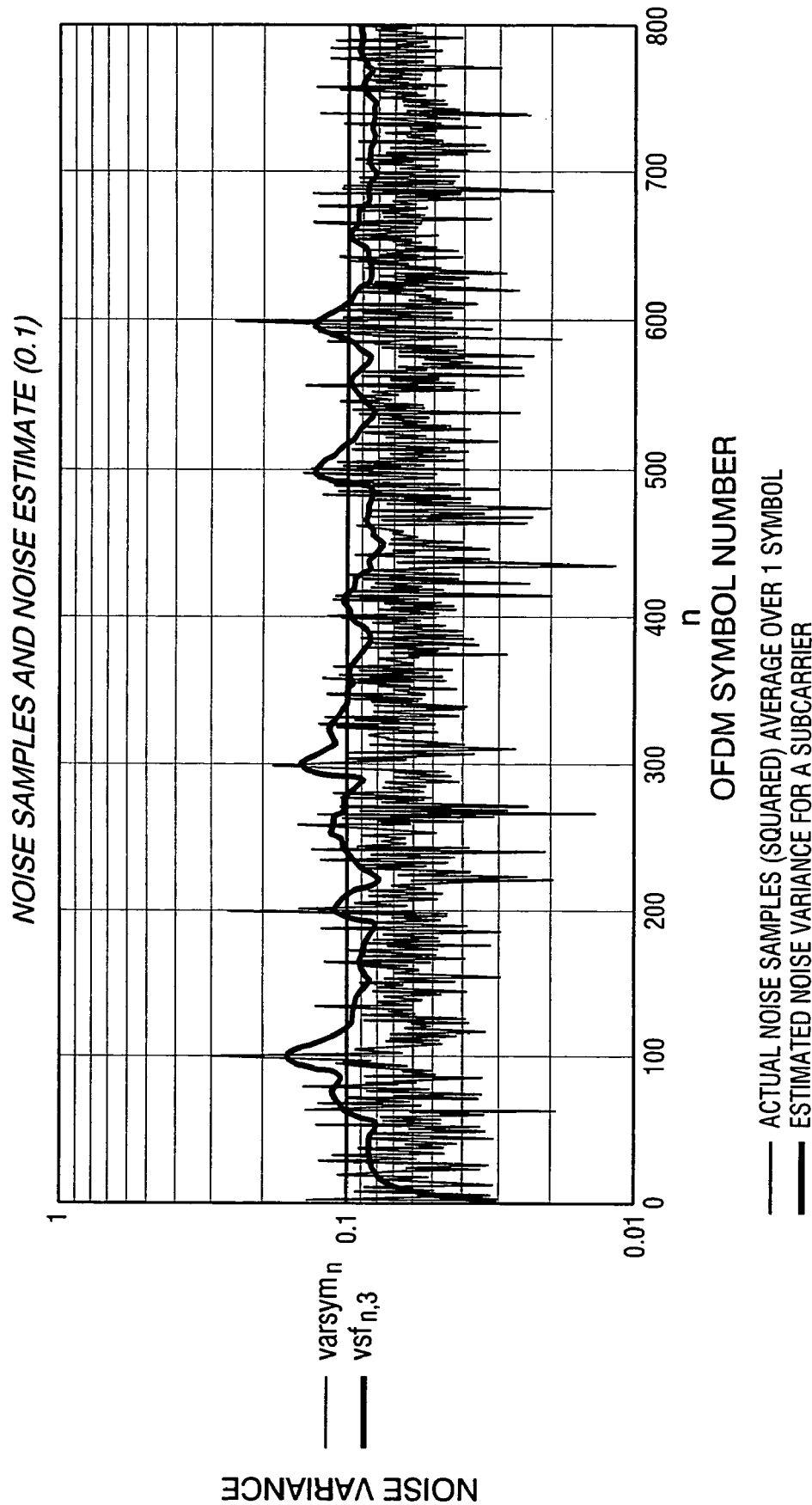
FIG. 37 is a plot showing the effects of switch transients on the noise estimates (10 dB SNR) with original 11-tap FIR filter and IIR noise estimation with modification to $\alpha=1/8$.
Figure 38:
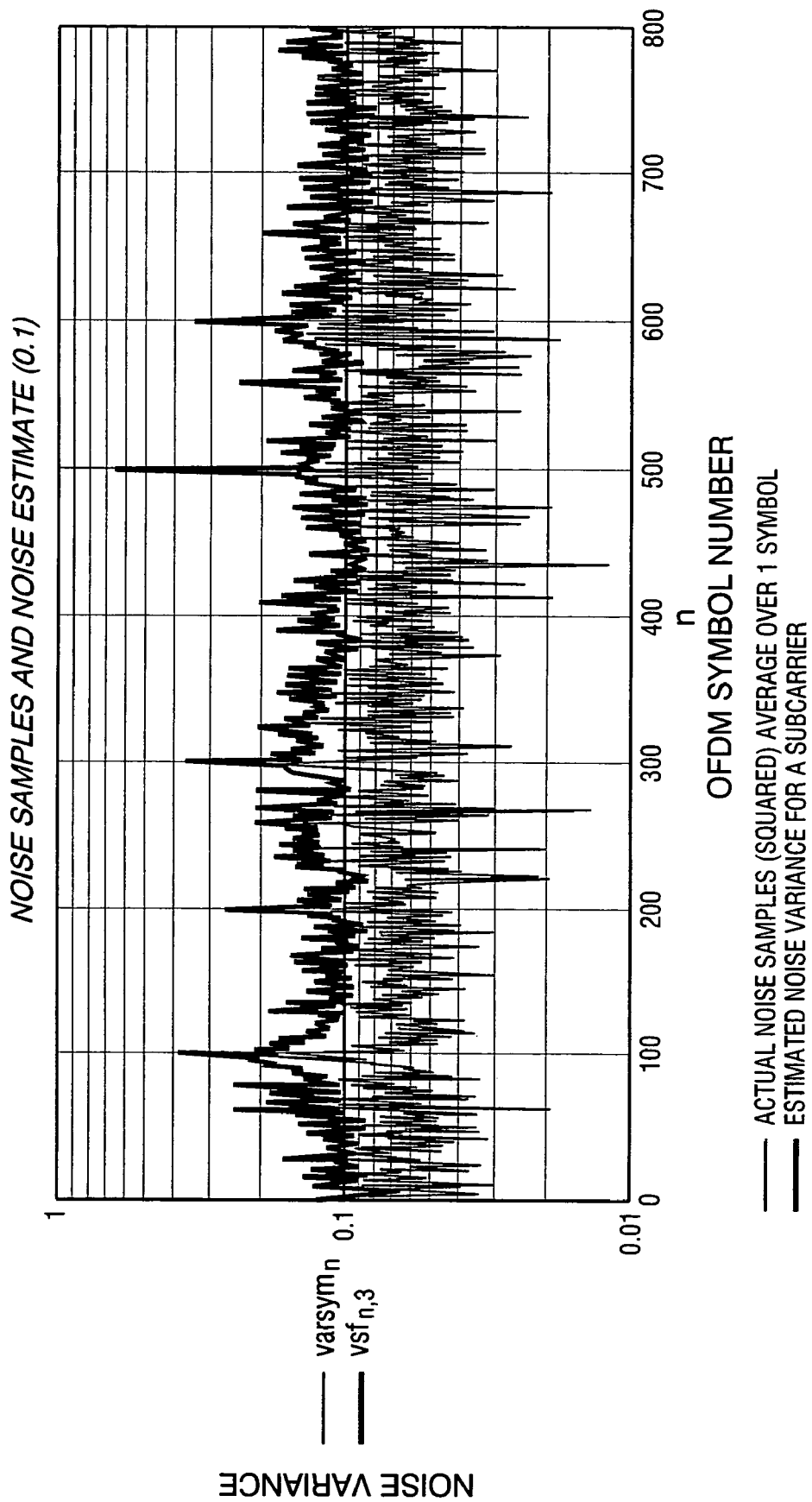
FIG. 38 is a plot showing the effects of switch transients on the noise estimates (10 dB SNR) with original 11-tap FIR filter when noise variance modification is applied.
Figure 39:
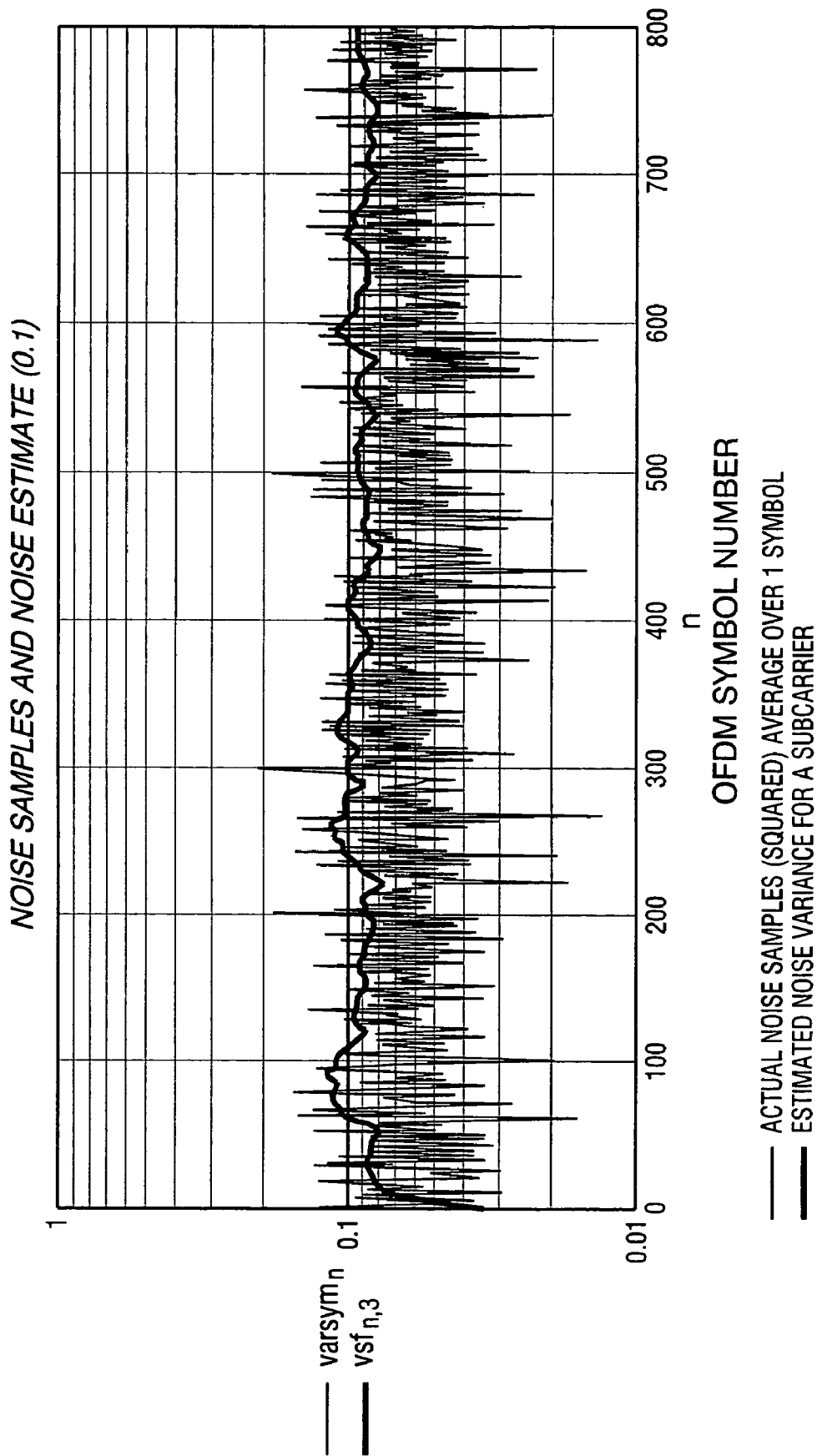
FIG. 39 is a plot showing the effects of switch transients on the noise estimates (10 dB SNR) with 5-tap median filter and IIR noise estimation with modification to $\alpha=1/8$.
Figure 40:
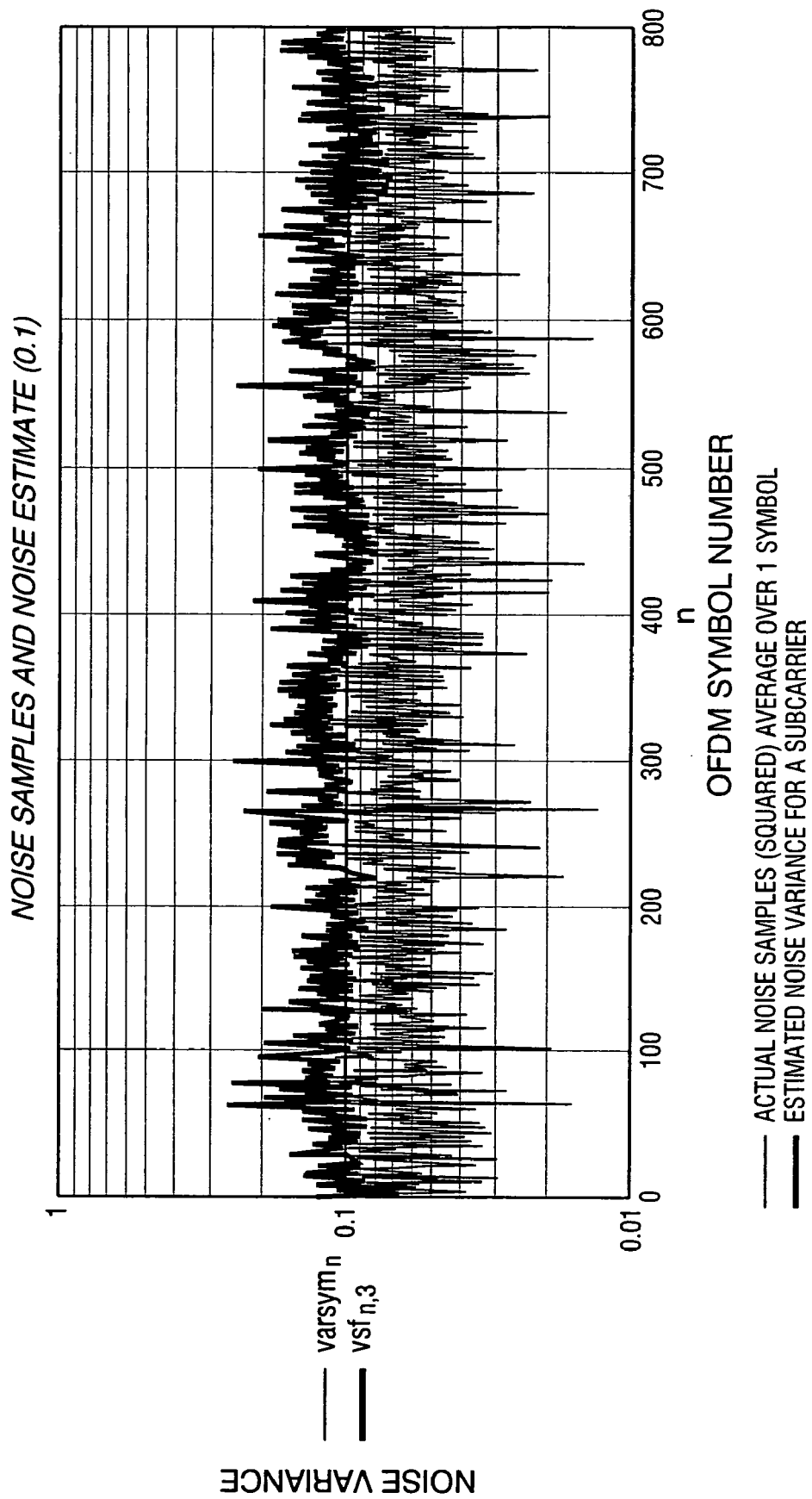
FIG. 40 is a plot showing the effects of switch transients on the noise estimates (10 dB SNR) with 5-tap median filter when noise variance modification is applied.

The effects of the modifications on both the residual coherent estimation errors and the noise variance estimates are shown in FIGS. 36 through 40. FIG. 36 is a plot showing the effects of switch transients on the noise estimates (10 dB SNR) with the original 11-tap FIR filter and the original IIR noise estimation with $\alpha=\frac{1}{16}$. FIG. 37 is a plot showing the effects of switch transients on the noise estimates (10 dB SNR) with the original 11-tap FIR filter and the IIR noise estimation modified to $\alpha=\frac{1}{8}$. FIG. 38 is a plot showing shows the effects of switch transients on the noise estimates (10 dB SNR) with the original 11-tap FIR filter when a noise variance modification is applied. FIG. 39 is a plot showing the effects of switch transients on the noise estimates (10 dB SNR) with a 5-tap median filter and the IIR noise estimation modified to $\alpha=\frac{1}{8}$. FIG. 40 is a plot showing the effects of switch transients on the noise estimates (10 dB SNR) with a 5-tap median filter when the noise variance modification is applied.

The various components of the modifications are introduced in FIGS. 37 through 40, where FIG. 40 is the final result of all the modifications. FIG. 36 shows the performance of the original modem in terms of coherent reference noise and noise estimation errors. This figure shows the relatively high value of transient switching noise which is not captured in the noise estimation. The noise peaks are underestimated and the estimates in the vicinity of the peaks are overestimated due to IIR filter smoothing.

FIG. 37 shows a small improvement achieved by reducing the IIR filter time constant. FIG. 38 shows a significant improvement in the noise estimation, although the actual transient noise remains high. FIG. 39 shows a significant improvement in the coherent reference noise transients through the use of the 5-tap median filter, although the noise estimation does not capture the transient peaks.

FIG. 40 shows all the improvements resulting in the reduction of the coherent reference noise, while the noise estimation captures the short transient durations. Although the noise variance estimates may appear to be somewhat noisy in the plot, this choice of parameters yielded the best performance compromise over the range of tested scenarios.

This invention provides improvements to accommodate switching transients encountered with an FM switch diversity antenna system for the FM hybrid mode of the HD Radio™ system. These improvements involve the modification of the coherent tracking and noise variance estimation algorithms. The new algorithms were analyzed and simulated in flat and selective fading at typical highway speeds and Raleigh fading. The simulations show good coherent tracking performance and noise estimation. The improvements yielded significantly better performance with a fast AGC, antenna diversity switching, first adjacent FM interference, and the extreme selective fading environments.

Figure 41:
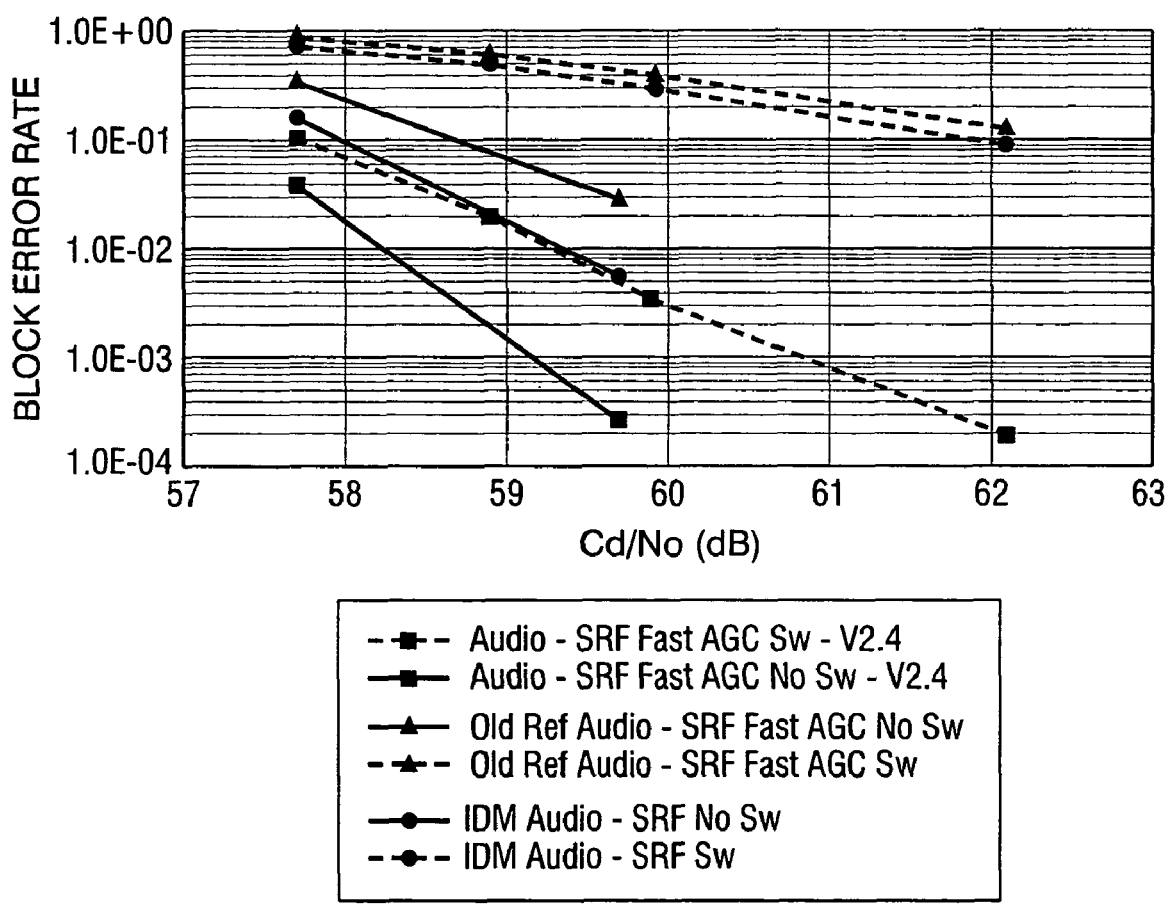
FIGS. 41 and 42 are graphs of block error rate.
Figure 42:
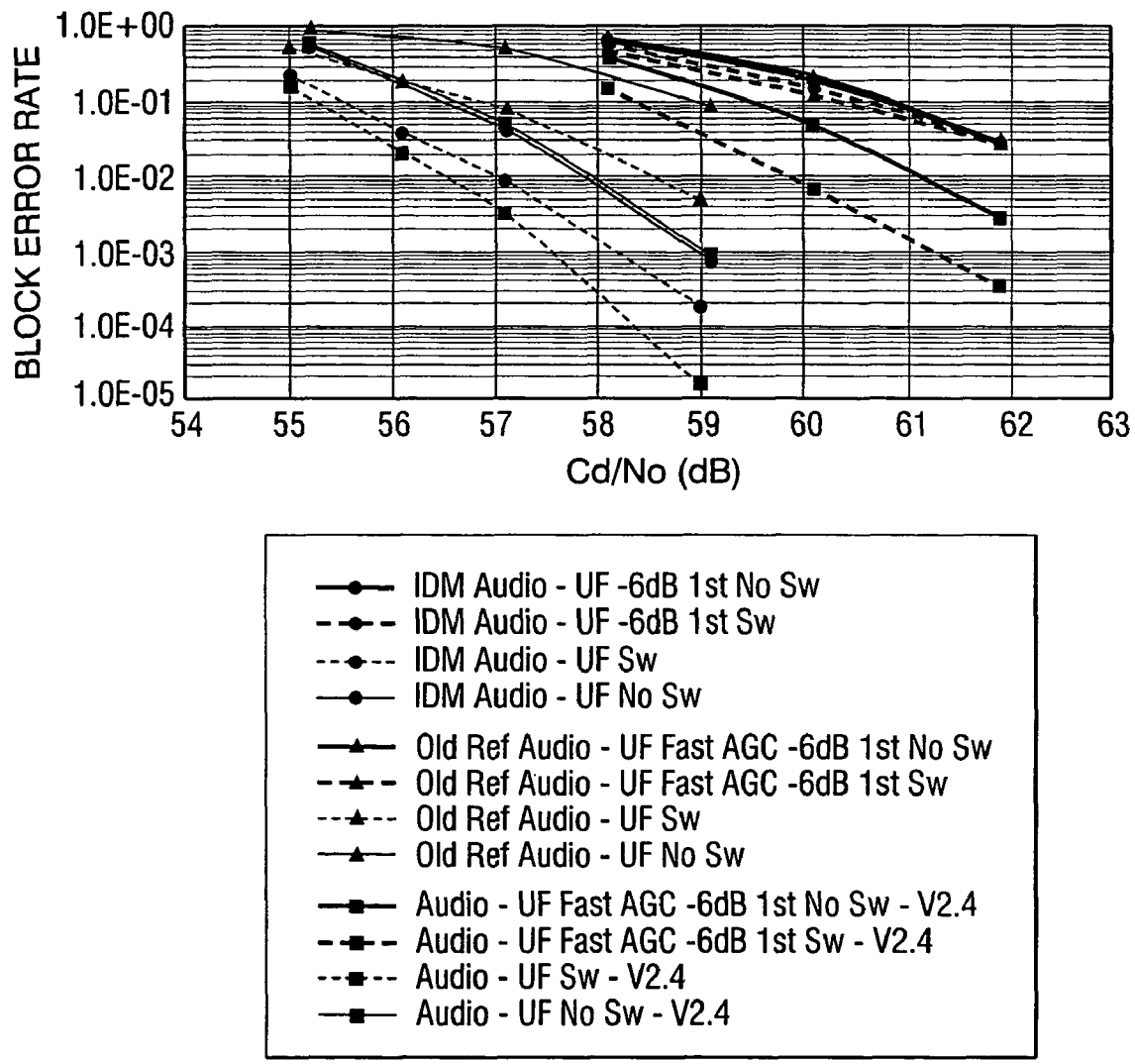

Lab testing of the new reference receiver software (modified to handle antenna diversity switching) has been completed. The final version appears to provide acceptable performance gains in some key fading and interference environments. FIG. 41 quantitatively indicates performance in SRF fading, while FIG. 42 shows performance in UF fading.

The performance of the new code in all environments significantly exceeds that of the IDM and old reference code. These results indicate that, in all environments tested with a fast AGC, the new code outperforms the IDM and old reference code—often by a large margin.

Figure 43:
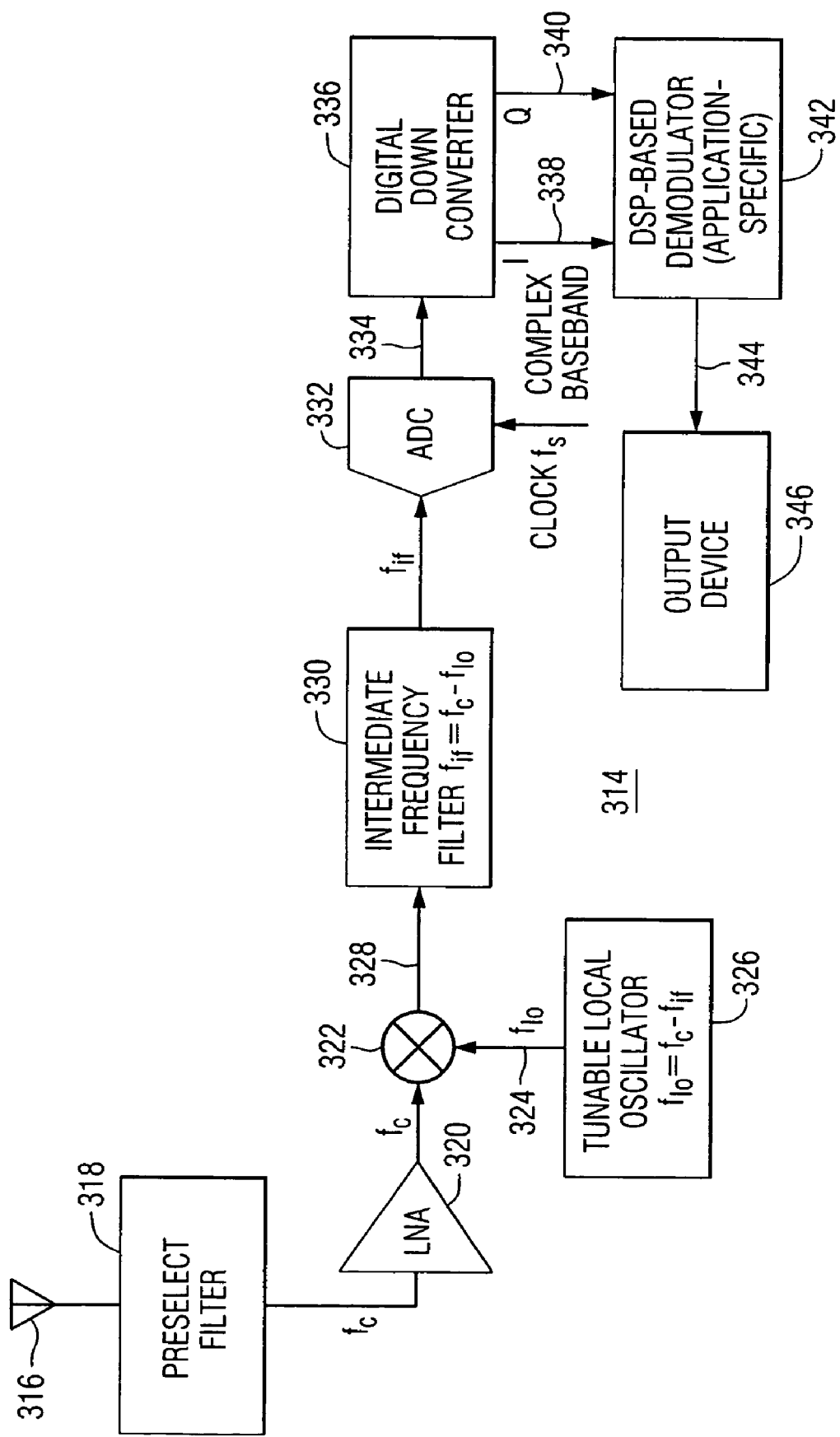
FIG. 43 is a block diagram of a receiver that can process signals in accordance with this invention.

FIG. 43 is a block diagram of a radio receiver 314 capable of performing the signal processing in accordance with this invention. The HD Radio™ signal is received on antenna 316. A bandpass preselect filter 318 passes the frequency band of interest, including the desired signal at frequency $f_c$, but rejects the image signal at $(f_c - 2f_{if})$ (for a low sideband injection local oscillator). Low noise amplifier 320 amplifies the signal. The amplified signal is mixed in mixer 322 with a local oscillator signal $f_{lo}$ supplied on line 324 by a tunable local oscillator 326. This creates sum $(f_c + f_{lo})$ and difference $(f_c - f_{lo})$ signals on line 328. Intermediate frequency filter 330 passes the intermediate frequency signal $f_{if}$ and attenuates frequencies outside of the bandwidth of the modulated signal of interest. An analog-to-digital converter 332 operates using a clock signal $f_s$ to produce digital samples on line 334 at a rate $f_s$. Digital down converter 336 frequency shifts, filters and decimates the signal to produce lower sample rate in-phase and quadrature signals on lines 338 and 340. A digital signal processor 342 then provides additional signal processing, including the coherent tracking described above, to produce an output signal on line 344 for output device 346.

While the invention has been described in terms of several examples, it will be apparent to those skilled in the art that various changes can be made to the disclosed embodiments without departing from the scope of the invention as set forth in the following claims.

What is claimed is:

1. A method for coherently tracking a radio signal including a plurality of digitally modulated reference subcarriers, the method comprising the steps of:

using a plurality of antenna elements to receive symbols transmitted on the reference subcarriers; and using processing circuitry to coherently track the received symbols by combining the reference subcarrier symbols with a known reference sequence conjugate to produce a plurality of samples, median filtering the samples to produce filtered samples, and to maintain a step transient in the received signal, and smoothing the samples for each of the reference subcarriers over the plurality of reference subcarriers to produce a coherent reference signal estimate for each of the subcarriers.

2. The method of claim 1, wherein the step transient is caused by switching among the antenna elements.

3. The method of claim 1, wherein the processing circuitry further performs the steps of:

using the plurality of samples and the coherent reference signal estimate for each of the subcarriers to produce a noise variance signal;

filtering the noise variance signal to produce a filtered noise variance signal;

selecting between the noise variance signal and the filtered noise variance signal to determine a selected noise variance signal; and smoothing the selected noise variance signal for each of the reference subcarriers over the plurality of reference subcarriers to produce a signal noise variance estimate for each of the subcarriers.

4. The method of claim 3, wherein the step of using the plurality of samples and the coherent reference signal estimate for each of the subcarriers to produce a noise variance signal comprises the steps of:

subtracting the coherent reference signal estimate from the plurality of samples to produce a noise sample; and squaring the magnitude of the noise sample to produce the noise variance signal.

5. The method of claim 3, wherein the step of filtering the noise variance signal to produce a filtered noise variance signal comprises the step of:

sequentially passing the noise variance signal through a median filter and an additional filter to smooth the noise variance signal over frequency.

6. The method of claim 5, wherein the additional filter comprises:

an infinite impulse response filter or a finite impulse response filter.

7. The method of claim 3, wherein the processing circuitry further performs the step of:

scaling the noise variance signal prior to the step of selecting between the noise variance signal and the filtered noise variance signal to determine a selected noise variance signal.

8. A receiver for coherently tracking a radio signal including at least one digitally modulated reference carrier, the receiver comprising:

an input for receiving the radio signal; and a processor for coherently tracking a radio signal including a plurality of digitally modulated reference subcarriers, by receiving symbols transmitted on the reference subcarriers, combining the reference subcarrier symbols with a known reference sequence conjugate to produce a plurality of samples, median filtering the samples to produce filtered samples and to maintain a step transient in the received signal, and smoothing the samples for each of the reference subcarriers over the plurality of reference subcarriers to produce a coherent reference signal estimate for each of the subcarriers.

9. The receiver of claim 8, further comprising:

a plurality of antenna elements for receiving the radio signal, wherein an impulsive noise transient is caused by switching among the antenna elements.

10. The receiver of claim 8, wherein the processor further uses the plurality of samples and the coherent reference signal estimate for each of the subcarriers to produce a noise variance signal; filters the noise variance signal to produce a filtered noise variance signal; selects between the noise variance signal and the filtered noise variance signal to determine a selected noise variance signal; and smoothes the selected noise variance signal for each of the reference subcarriers over the plurality of reference subcarriers to produce a signal noise variance estimate for each of the subcarriers.

11. The receiver of claim 10, wherein the processor further subtracts the coherent reference signal estimate from the plurality of samples to produce a noise sample; and squares the magnitude of the noise sample to produce the noise variance signal.

12. The receiver of claim 10, wherein the processor sequentially passes the noise variance signal through a median filter and an additional filter.

13. The receiver of claim 10, wherein the additional filter comprises:

an infinite impulse response filter or a finite impulse response filter.

14. The receiver of claim 10, wherein the processor scales the noise variance signal prior to selecting between the noise variance signal and the filtered noise variance signal to determine a selected noise variance signal.

15. The method of claim 1, further comprising the step of:

removing data from the reference subcarriers prior to the combining step.

* * * * *